(12) United States Patent
Iwashita

(10) Patent No.: US 8,533,541 B2
(45) Date of Patent: Sep. 10, 2013

(54) VERIFICATION SUPPORT OF CIRCUIT BLOCKS HAVING INDEPENDENT CLOCK DOMAINS

(75) Inventor: Hiroaki Iwashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 193 days.

(21) Appl. No.: 13/064,902

(22) Filed: Apr. 25, 2011

(65) Prior Publication Data

US 2012/0005545 A1    Jan. 5, 2012

(30) Foreign Application Priority Data

Jul. 2, 2010   (JP) .................................. 2010-152257

(51) Int. Cl.
   *G11C 29/00*    (2006.01)
(52) U.S. Cl.
   USPC ......................................... 714/700; 716/108
(58) Field of Classification Search
   USPC .................... 714/700, 744; 716/108
   See application file for complete search history.

(56) References Cited

U.S. PATENT DOCUMENTS

| | | | | |
|---|---|---|---|---|
| 6,099,579 A * | 8/2000 | Dowling et al. | ............. | 716/102 |
| 6,260,152 B1 * | 7/2001 | Cole et al. | ..................... | 713/400 |
| 6,353,906 B1 * | 3/2002 | Smith et al. | ................... | 714/741 |
| 7,139,988 B2 * | 11/2006 | Chard et al. | .................. | 716/108 |
| 7,328,117 B2 * | 2/2008 | Sakamaki et al. | ............ | 702/117 |
| 7,356,789 B2 * | 4/2008 | Ly et al. | ........................ | 716/108 |
| 7,382,824 B1 * | 6/2008 | Marmash et al. | ............. | 375/224 |
| 7,484,192 B2 * | 1/2009 | Ja et al. | ......................... | 716/106 |
| 2004/0225977 A1 * | 11/2004 | Akkerman | ........................ | 716/6 |
| 2005/0216247 A1 * | 9/2005 | Ikeda et al. | ..................... | 703/19 |
| 2007/0244685 A1 * | 10/2007 | Ja et al. | ........................... | 703/15 |
| 2008/0069277 A1 * | 3/2008 | Derti et al. | ..................... | 375/354 |
| 2009/0077440 A1 | 3/2009 | Inagawa | | |

FOREIGN PATENT DOCUMENTS

| | | |
|---|---|---|
| JP | 2009-093635 | 4/2009 |
| JP | 2009-187119 | 8/2009 |
| JP | 2009-187344 | 8/2009 |

* cited by examiner

*Primary Examiner* — Steve Nguyen
(74) *Attorney, Agent, or Firm* — Staas & Halsey LLP

(57) ABSTRACT

A computer-readable, non-transitory medium stores a program that causes a computer to execute detecting in a circuit-under-test, a change in a signal output from each circuit element on a transmission-side, during one clock cycle on a reception-side at an asynchronous location; inputting to each circuit element on the reception-side, a signal for which a change is not detected at a detection time among detection times when a signal change is detected at the detecting and replacing with a random logic value, a signal for which a change has been detected at a detection time among the detection times and inputting the random logic value to each circuit element on the reception-side, in an action triggered by a rising edge of an operation clock on the reception-side after the one clock cycle; and outputting for each circuit element on the reception-side, an operation result obtained based on input at the inputting.

13 Claims, 23 Drawing Sheets

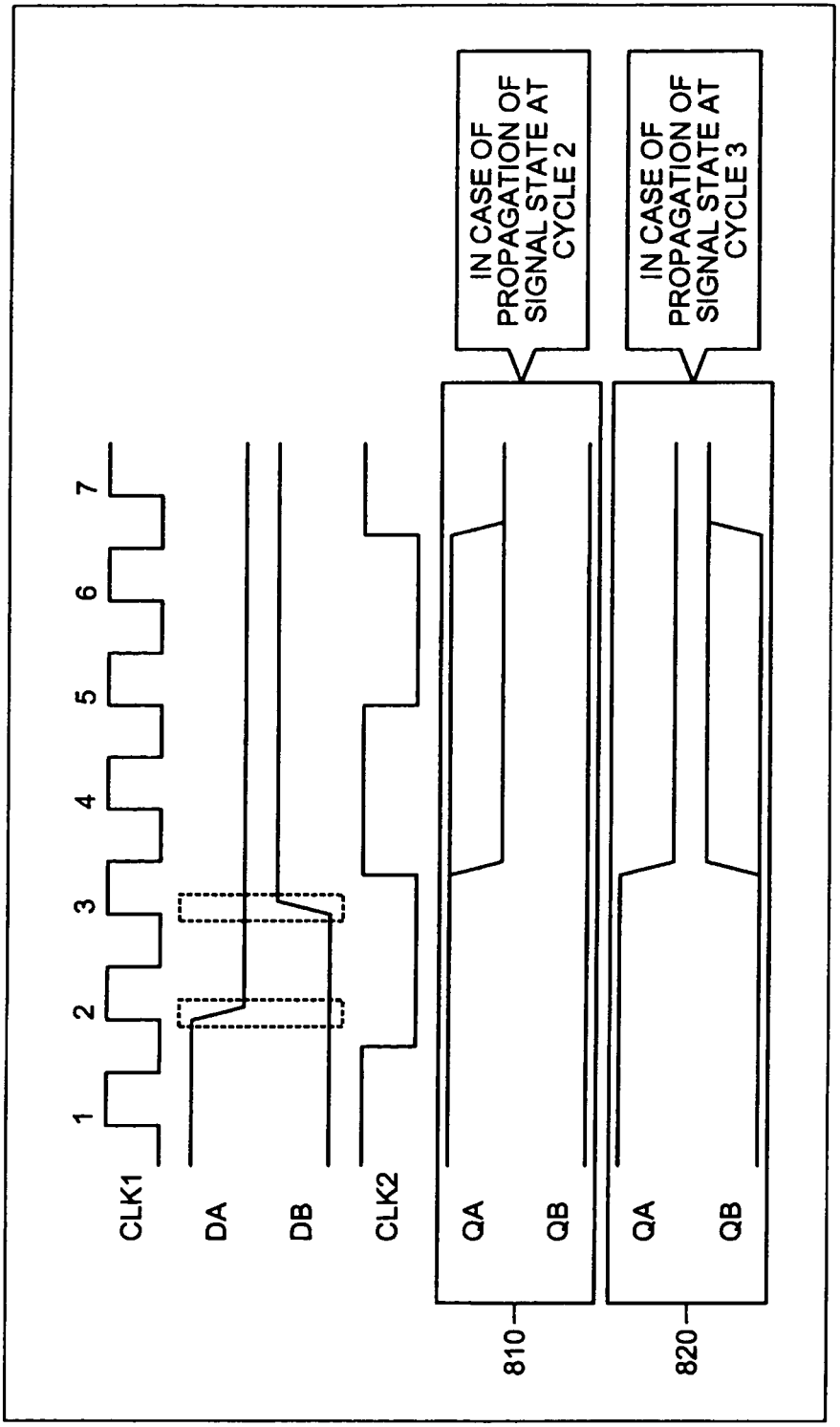

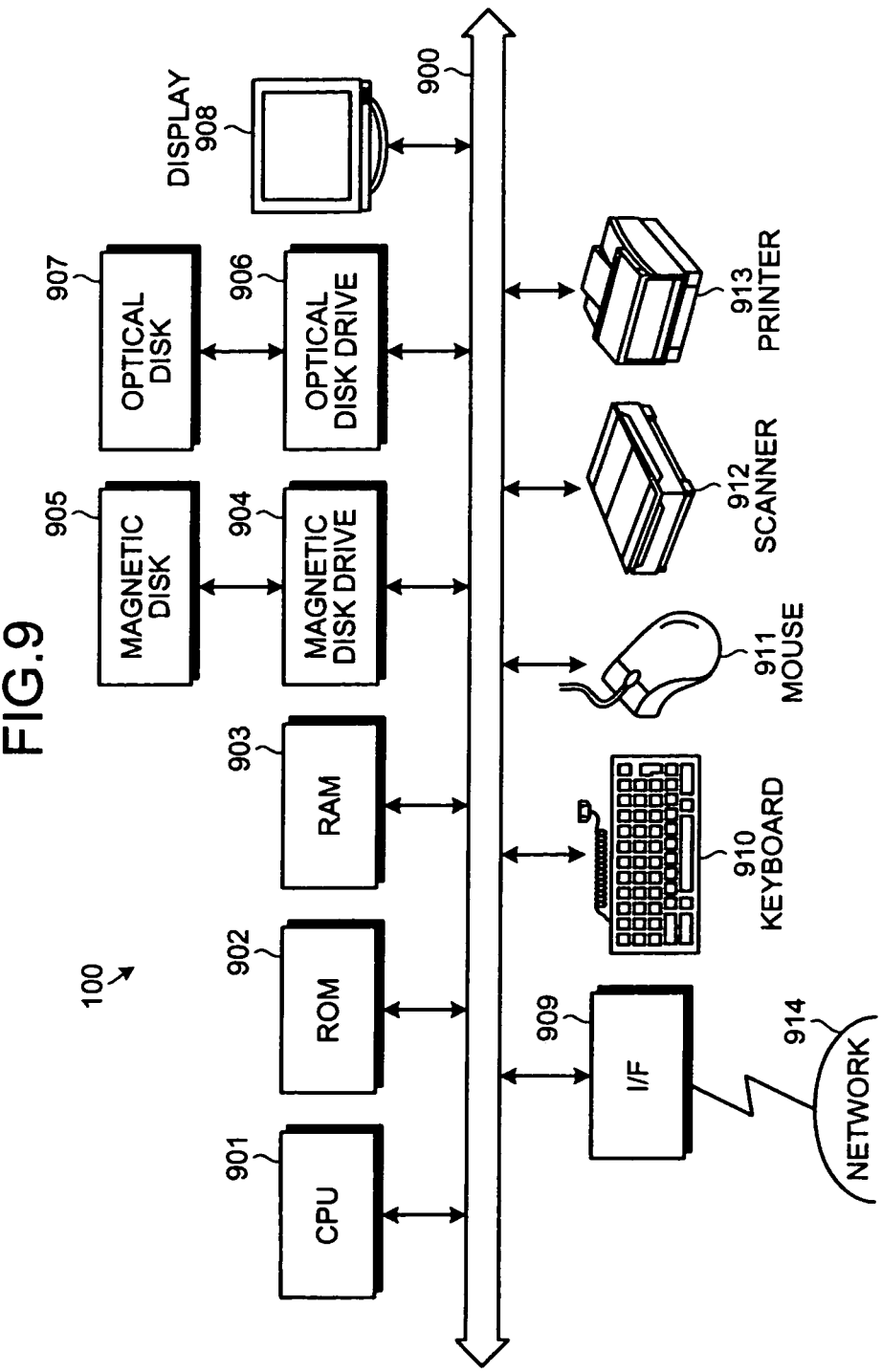

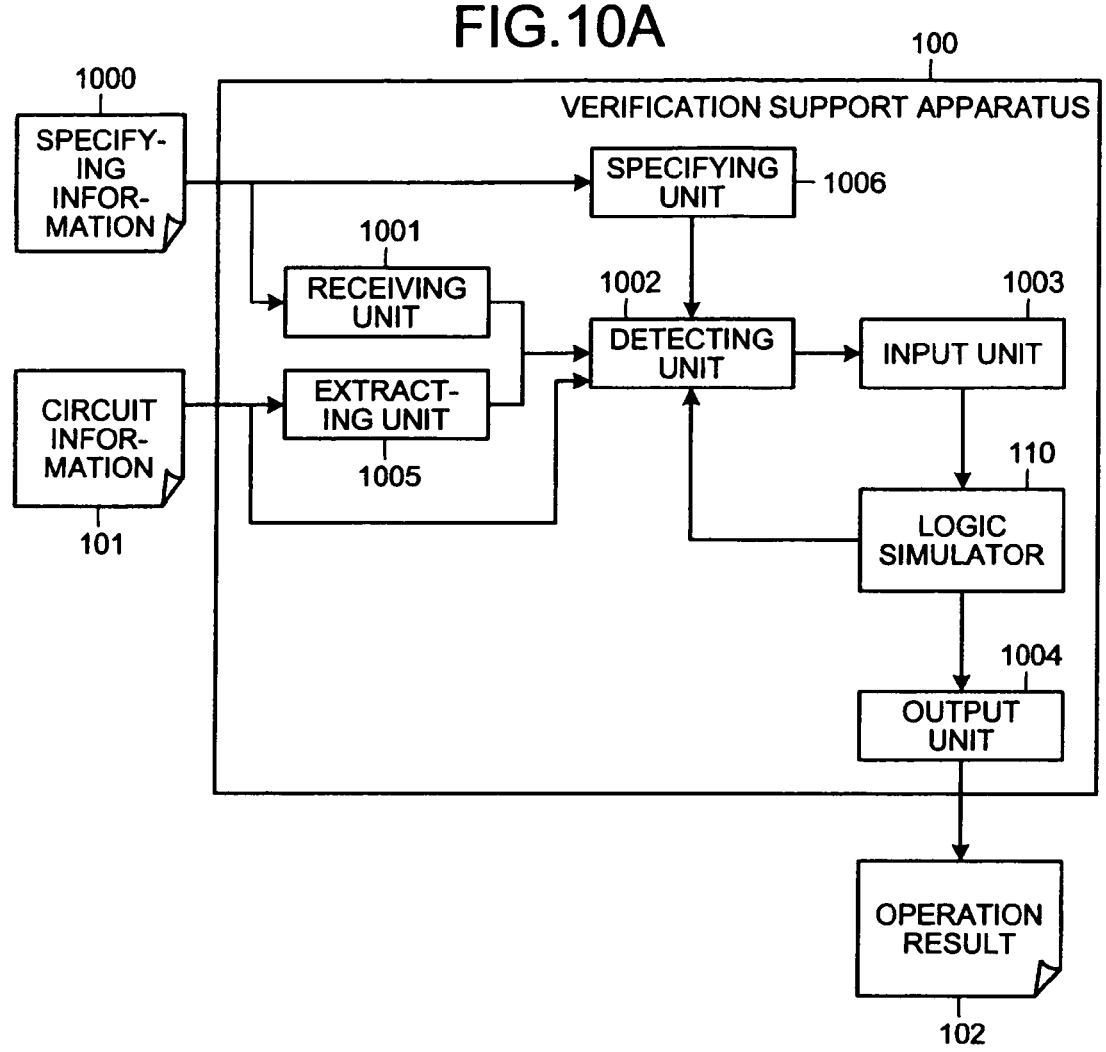

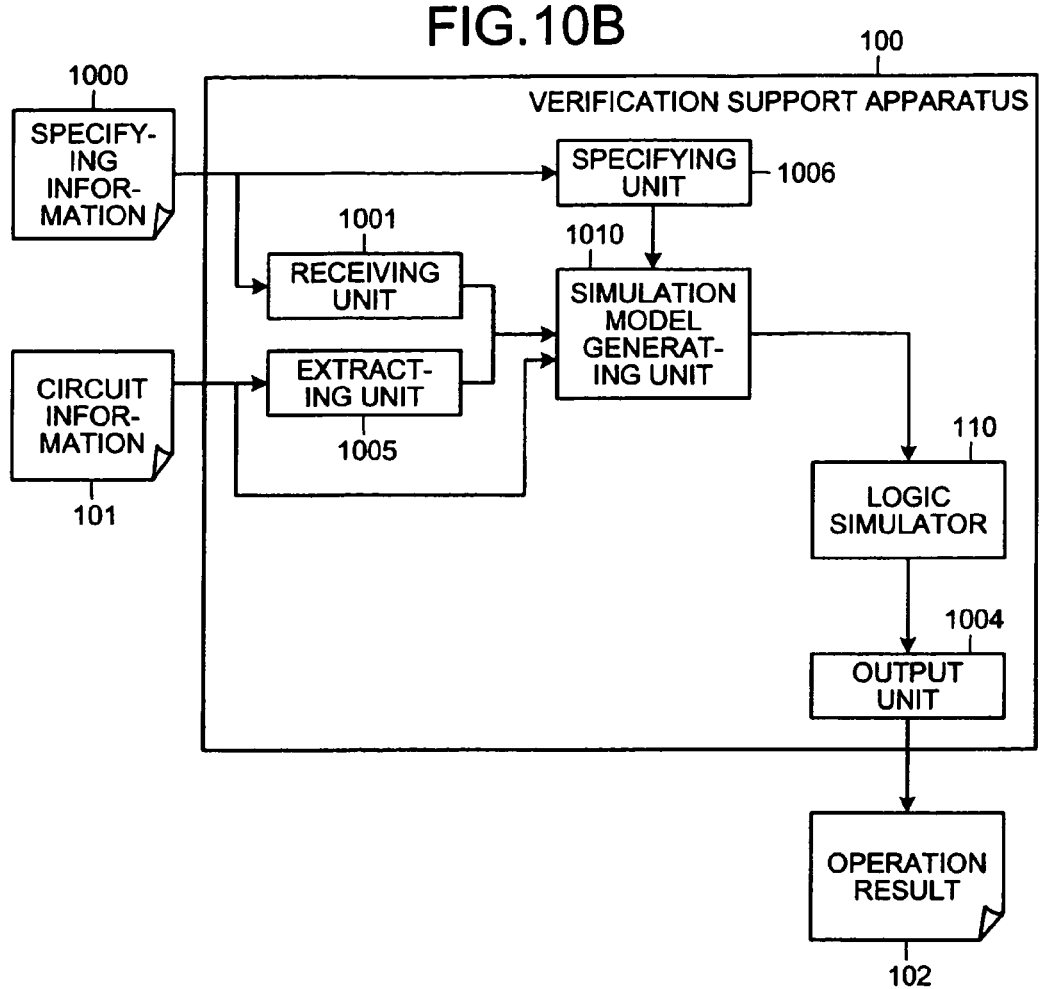

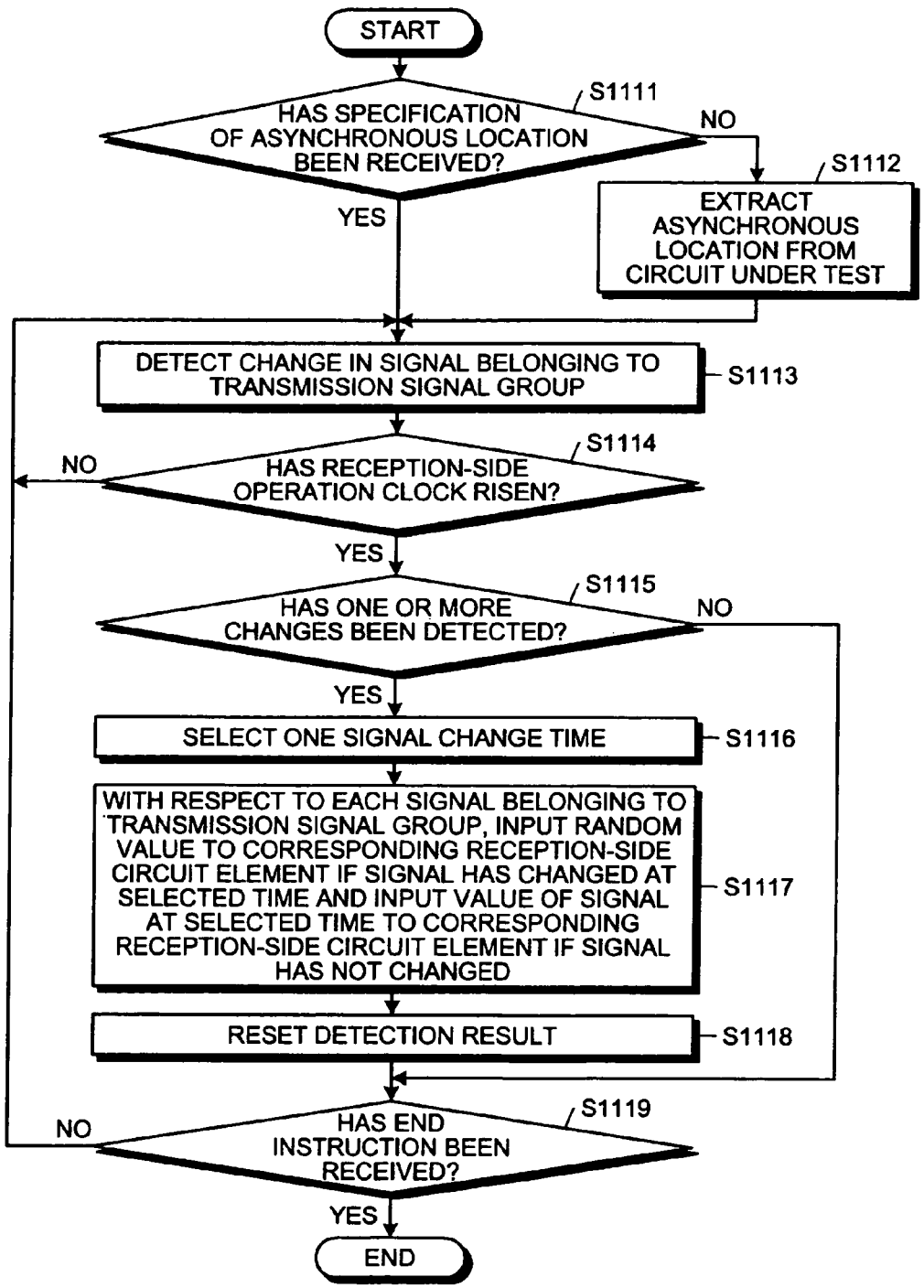

US 8,533,541 B2

VERIFICATION SUPPORT OF CIRCUIT BLOCKS HAVING INDEPENDENT CLOCK DOMAINS

CROSS REFERENCE TO RELATED APPLICATIONS

This application is based upon and claims the benefit of priority of the prior Japanese Patent Application No. 2010-152257, filed on Jul. 2, 2010, the entire contents of which are incorporated herein by reference.

FIELD

The embodiment discussed herein is related to supporting logical verification of a circuit.

BACKGROUND

Conventionally, when signals are delivered between circuit blocks having independent clock sources, i.e., clock domain crossing (CDC), verification requires consideration of clock domain differences. In other words, whether a reception-side circuit block operates properly with a signal delivered between circuit blocks different in clock cycle has to be verified.

With advancing circuit integration in recent years, logic design to produce one circuit under test that includes thousands of CDCs is no longer anything out of the ordinary. At locations where asynchrony is caused by CDC, a meta-stable state inevitably occurs due to a violation of setup time, hold time, etc. in a reception-side circuit block, bringing about a need of verifying in advance that malfunction does not occur even if a meta-stable state occurs.

A technique related to "CDC simulation" for simulating the randomness of signals received from a different clock domain in logic simulation has been disclosed as a means for carrying out verification on a mechanism of delivering signals between CDC circuit blocks. For example, a verification support apparatus has been disclosed that when detecting an output signal output from each transmission-side circuit element at a CDC, generates jitter of an arbitrary value for a given time and inputs the jitter to a reception-side circuit element (see, e.g., Japanese Laid-Open Patent Publication Nos. 2009-187119, 2009-187344, and 2009-93635). The jitter input virtually reproduces the meta-stable state resulting from signal delivery between CDC circuit blocks, enabling verification of whether the reception-side circuit element at the CDC operates properly when a meta-stable state is generated.

The conventional techniques, however, poses a problem in that an omission in verification is apt to occur if a transmission-side operation clock at a CDC is shorter in frequency than a reception-side operation clock. For example, during one cycle of the reception-side operation clock, the transmission-side operation clock may run plural cycles and output plural output signals. In such a case, only the jitter based on an output signal output from a transmission-side circuit element immediately before the rising edge of the reception-side operation clock is input to each reception-side circuit element.

Consequently, changes in signals other than the output signal output from the transmission-side immediately before the rising edge of the reception-side operation clock are not reflected on the reception-side circuit element, resulting in an omission in verification of instances of generation of a meta-stable state, thus a problem of lower verification efficiency arises.

As described above, to verify what effect each of the signals output at differing timings from the transmission-side circuit elements has on the operation of the reception-side circuit elements, CDC simulation must be repeated until the effect of each output signal output at each timing is reflected on the operation. Hence, simulation has to be repeated many times, which leads to an increase in the work load and the work time to carry out logic verification, inviting a problem of a longer design period.

SUMMARY

According to an aspect of an embodiment, a computer-readable, non-transitory medium stores therein a verification support program that causes a computer to execute a process that includes detecting in a circuit under test, a change in a signal output from each circuit element on a transmission-side, during one clock cycle on a reception-side at an asynchronous location where data is transferred between clock domains having differing operation clocks; inputting to each circuit element on the reception-side, a signal for which a change is not detected at a detection time among detection times when a signal change is detected at the detecting and replacing with a random logic value, a signal for which a change has been detected at a detection time among the detection times and inputting the random logic value to each circuit element on the reception-side, in an action triggered by a rising edge of an operation clock on the reception-side after the one clock cycle; and outputting for each circuit element on the reception-side, an operation result obtained based on input at the inputting.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a timing chart of an example of signal propagation in a case of the verification support process according to the embodiment.

FIG. 9 is a block diagram of a hardware configuration of a verification support apparatus according to the embodiment.

FIG. 10A is a block diagram of a first functional configuration of the verification support apparatus.

FIG. 10B is a block diagram of a second functional configuration of the verification support apparatus.

FIG. 11A is a flowchart of a first verification support procedure by the verification support apparatus.

DESCRIPTION OF EMBODIMENTS

Preferred embodiments of the present invention will be explained with reference to the accompanying drawings.

Figure 1:
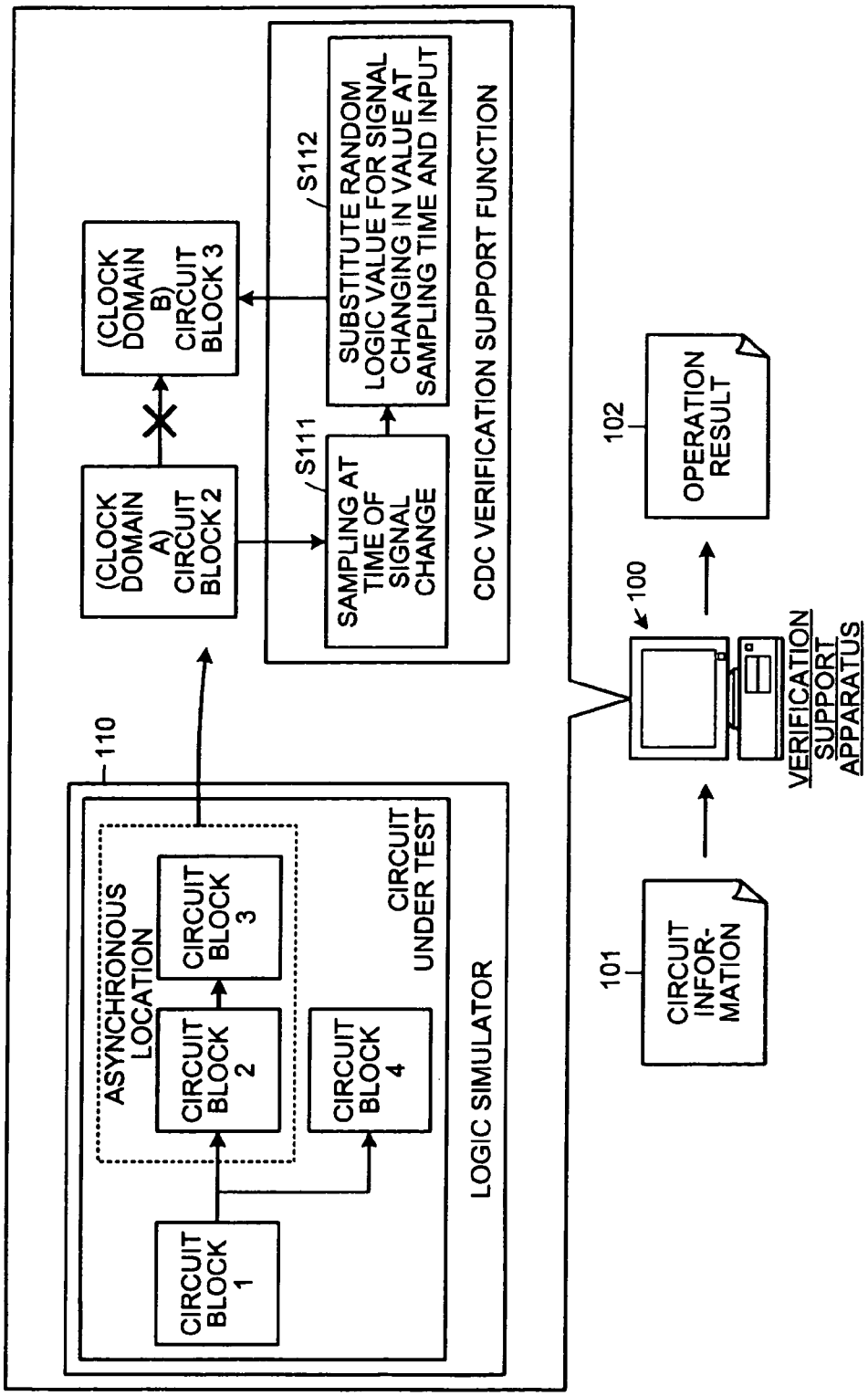
FIG. 1 is an explanatory diagram of an example of a verification support process according to an embodiment.

FIG. 1 is an explanatory diagram of an example of a verification support process according to an embodiment. The embodiment relates to an example of a method of improving verification quality and verification efficiency for logic design including CDCs. As described above, a CDC refers to a phenomenon where operation clock switching occurs as a result of delivery of a data signal between clock domains having differing operation clocks. In the following description, a location at which a CDC occurs is referred to as asynchronous location.

According to the verification support process of the embodiment, for example, a verification support apparatus 100 of FIG. 1 is used to verify whether a circuit element operates properly in the delivery of a CDC signal. For example, the verification support apparatus 100 is capable of verifying a meta-stable state through CDC simulation by a logic simulator 110.

When receiving circuit information 101 of a circuit under test, the logic simulator 110 configures the circuit under test using software. A test pattern is input to the circuit under test configured by the logic simulator 110, and an operation result 102 consequent to the input test pattern is output. A user verifies the presence/absence of a bug in the circuit under test, based on whether the user acquires the operation result 102 that corresponds to the logic design.

In the case of the verification support apparatus 100, an asynchronous location equivalent to a CDC at which operation clocks do not synchronize between circuit blocks must be checked to verify whether the asynchronous location operates properly even if a meta-stable state is generated. The verification support apparatus 100 thus has a CDC verification support function dedicated to verification of a CDC.

In the example depicted in FIG. 1, for example, among circuit blocks 1 to 4 included in the circuit under test, circuit block 2 and circuit block 3 constitute an asynchronous location between them because of their different operation clocks. Hence, the verification support apparatus 100 executes normal simulation through the logic simulator 110 on an asynchronous location at which a common operation clock works and verifies a meta-stable state on an asynchronous location, using the CDC verification support function.

Figure 2:
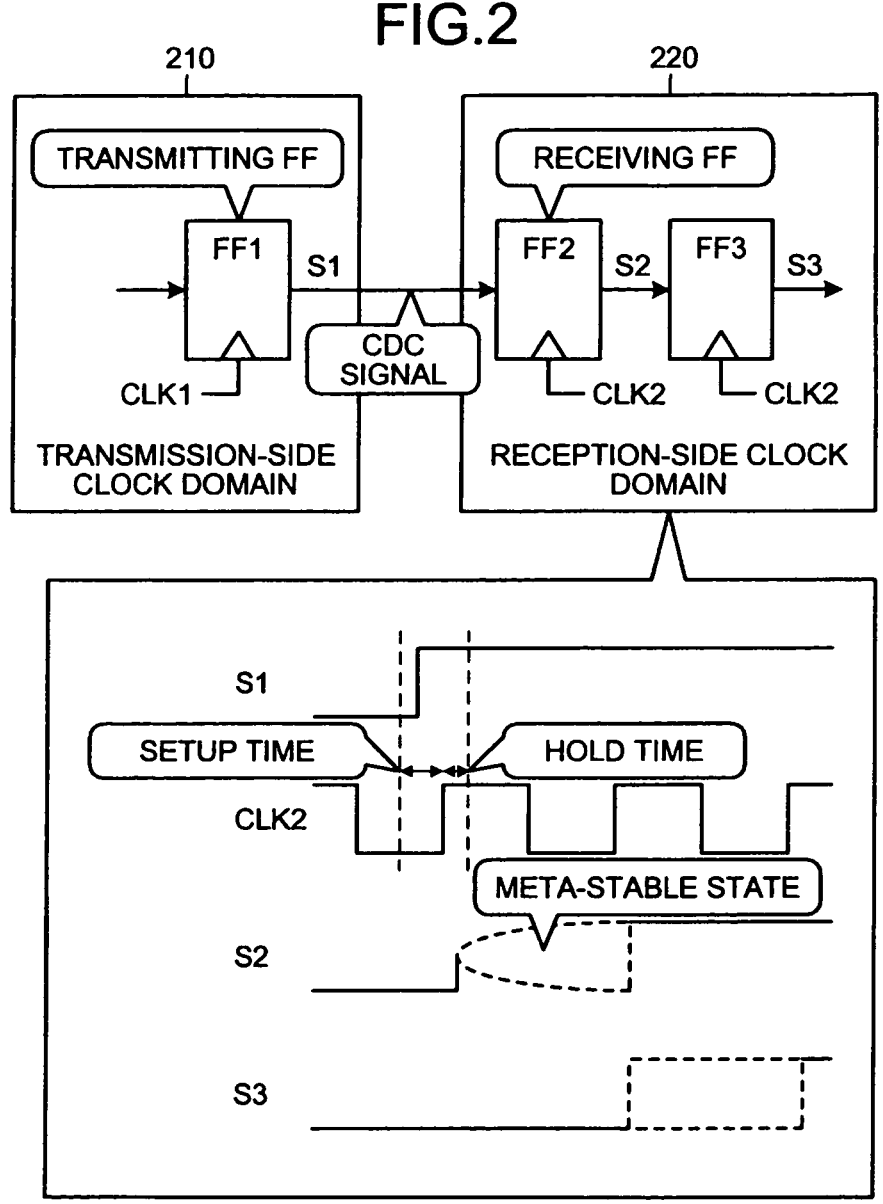
FIG. 2 is an explanatory diagram of the relation between a CDC signal and a meta-stable state.

FIG. 2 is an explanatory diagram of the relation between a CDC signal and a meta-stable state. When data is transferred across an asynchronous location, input signals become asynchronous in a reception-side clock domain and consequently, may give rise to various problems. If data signal delivery at an asynchronous location is not carried out properly, an error may occur in processing downstream from the asynchronous location.

During a phase of logic design, therefore, it is desirable to verify the operation of an asynchronous location to check whether data signal delivery is carried out properly. Grasping a potential problem hidden in the asynchronous location as early as possible and carrying out proper circuit modification leads to a shortening of the design period.

With reference to FIG. 2, the relation between a CDC signal and a meta-stable state at an asynchronous location will be described. A CDC signal means a signal that is transferred between circuit blocks having operation clocks that are different from each other. As depicted in FIG. 2, an upstream circuit block 210 has an FF 1, and a downstream circuit block 220 has an FF 2 and an FF 3. The circuit blocks 210 and 220 operate in respective clock domains that differ in cycle from each other. In FIG. 2, therefore, a signal coming from the FF 1 of the circuit block 210 into the FF 2 of the circuit block 220 is a CDC signal.

Generally, a circuit that processes digital signals, such as an FF, operates under such constraints as a setup time and a hold time. A setup time is the time required for maintaining the state of an input signal to take in the input signal without fail. A hold time is the time for maintaining the state of an output signal to propagate the output signal to an intended circuit element without fail.

In the case of a CDC signal, however, a clock cycle difference often results in a setup time violation or a hold time violation, as depicted in FIG. 2. The occurrence of a setup time violation or a hold time violation makes propagation of the CDC signal uncertain, thus leading to the generation of a meta-stable state in which a signal value is unstable, as in a case of an output signal S2 from the FF 2 depicted in FIG. 2.

However, in view of the configuration of a CDC, a setup time violation or a hold time violation is inevitable. Therefore, it is necessary to verify a circuit having CDCs to confirm that malfunction does not occur even if a meta-stable state is generated. If a location where malfunction occurs is found by verification, the design is changed to prevent malfunction.

Figure 3:
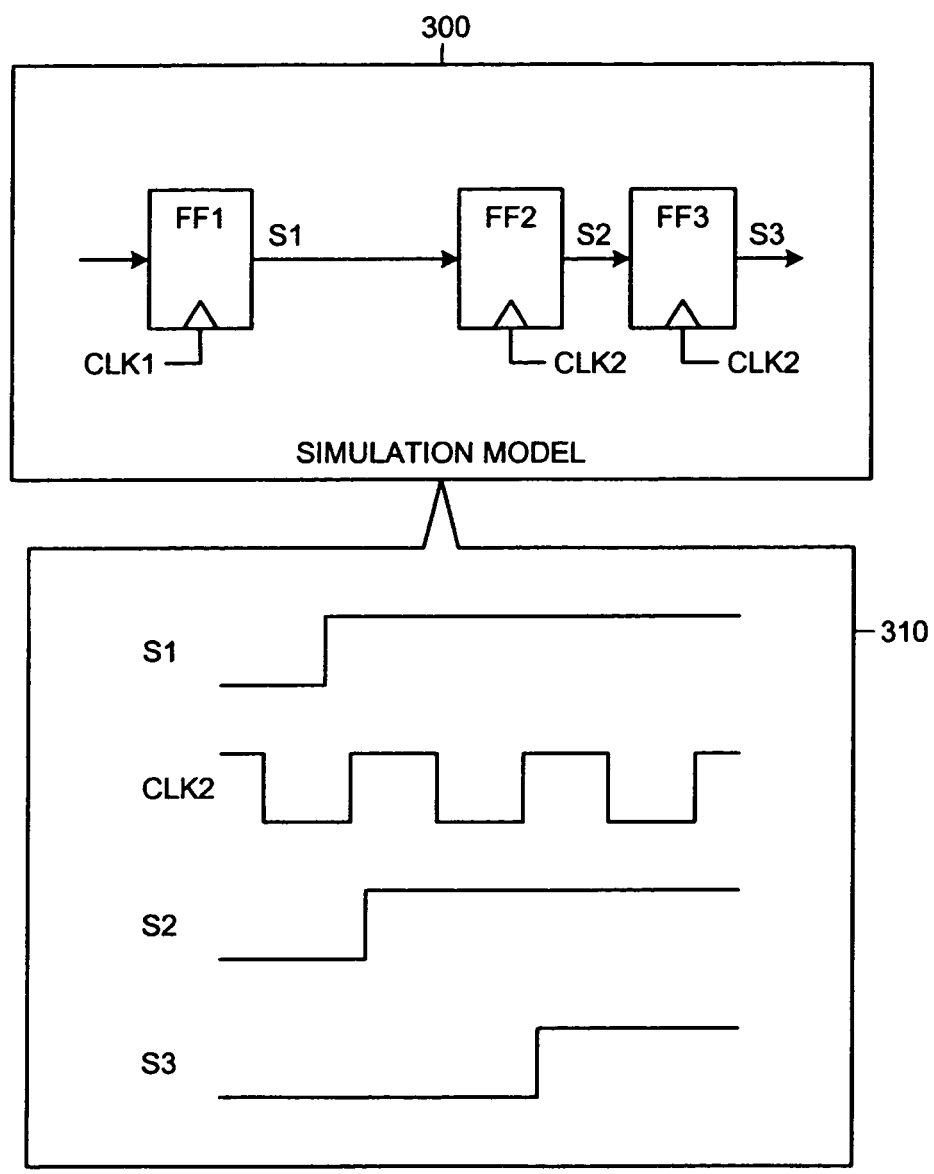
FIG. 3 is an explanatory diagram of an example of conventional logic simulation.
Figure 4:
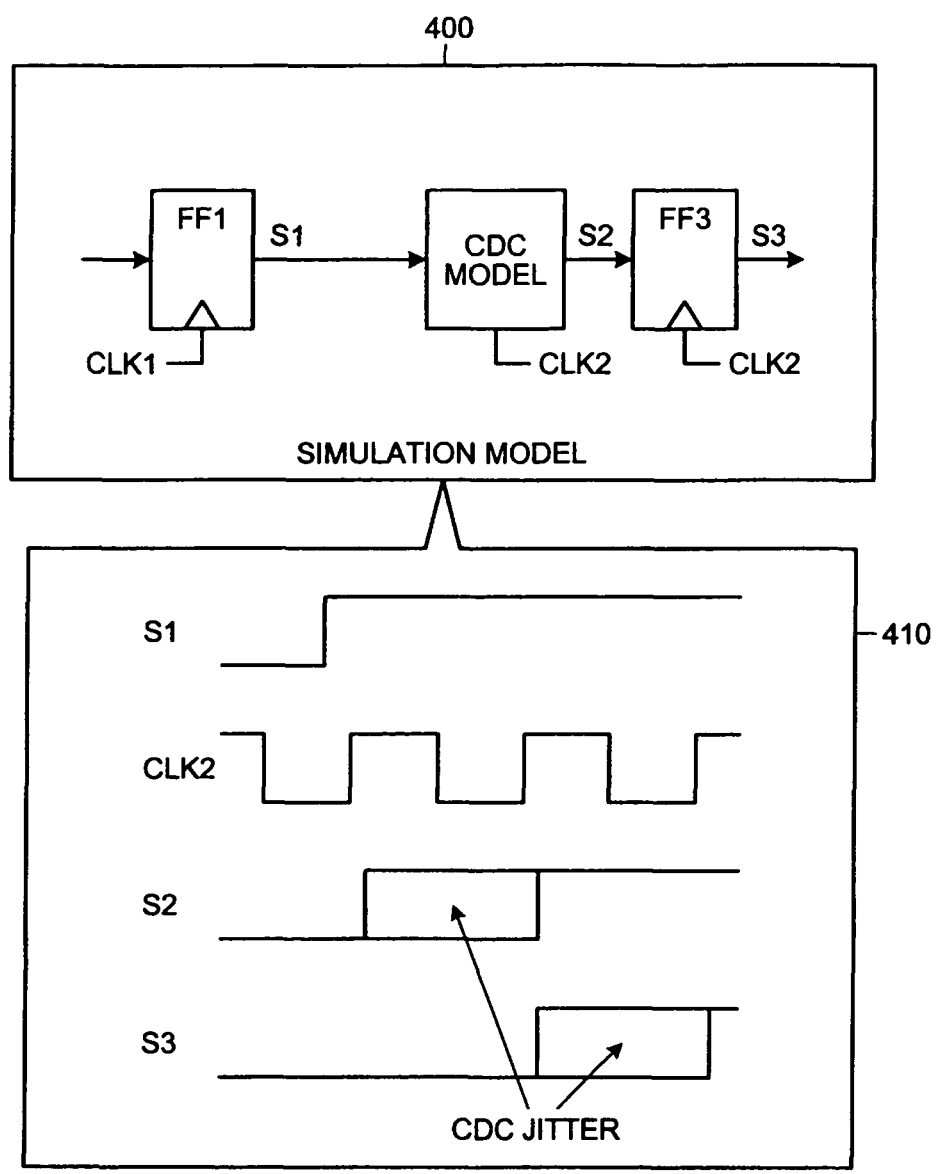
FIG. 4 is an explanatory diagram of an example of conventional CDC simulation.

FIG. 3 is an explanatory diagram of an example of conventional logic simulation. FIG. 4 is an explanatory diagram of an example of conventional CDC simulation. In the case of conventional logic simulation, like a simulation model 300 of FIG. 3, circuit configuration is made up as a software-based configuration. The operation contents of each circuit element of the simulation model 300 are depicted in a timing chart 310, which indicates that no meta-stable state is generated, making verification of the presence/absence of malfunction impossible.

In the case of CDC simulation depicted in FIG. 4, to reproduce a meta-stable state due to a CDC, a simulation model 400 includes a CDC model that replaces an actual circuit element (FF 2 in FIG. 4) to reproduce the meta-stable state. As depicted in a timing chart 410, the CDC model outputs a random logic value (CDC jitter) for one cycle in response to an input signal S1 from the FF 1 upstream to reproduce the meta-stable state.

Figure 5:
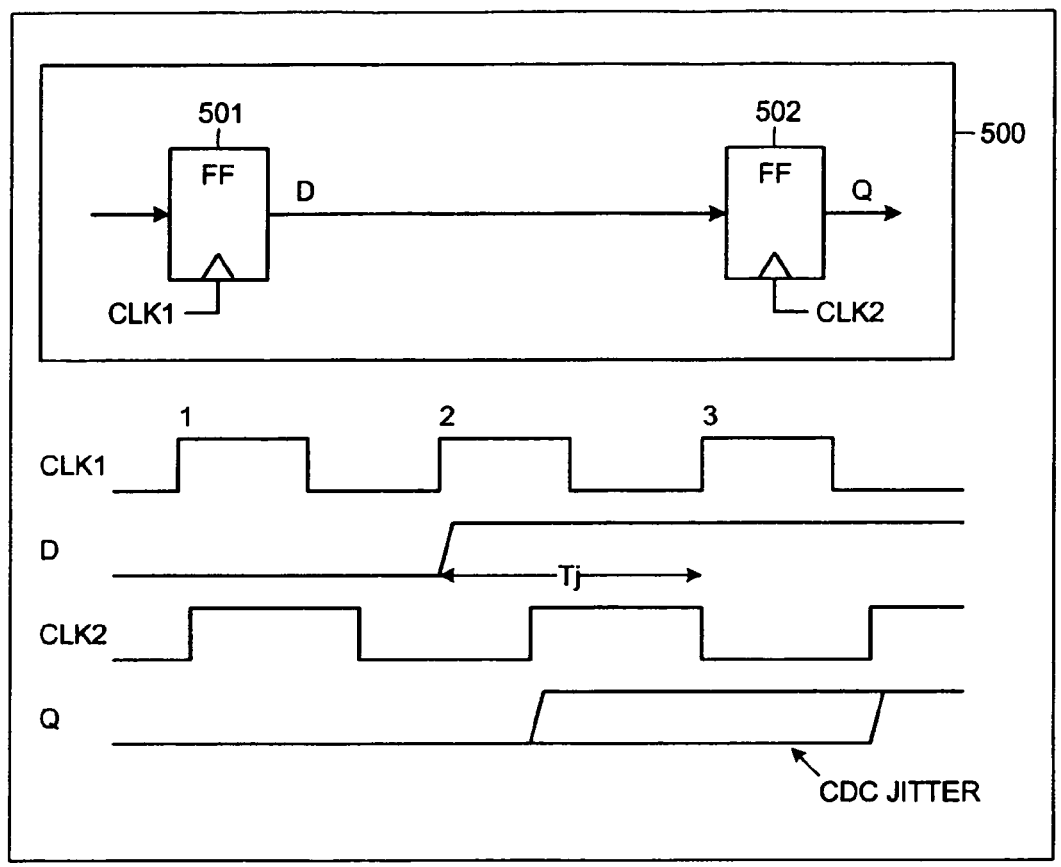
FIG. 5 is a timing chart of an example of the generation of CDC jitter.

FIG. 5 is a timing chart of an example of the generation of CDC jitter. For example, a circuit like a simulation model 500 is to be verified. In the simulation model 500, the clock domain for a transmission-side FF 501 is different from the clock domain for a reception-side FF 502. Hence, a change in an output signal D from the transmission-side FF 501 is observed and CDC jitter is generated as an output signal Q from the reception-side FF 502.

To actually generate CDC jitter, the reception-side FF 502 must be replaced with a CDC model, as in the example depicted in FIG. 4. To clarify a configuration of the circuit under test, however, FIG. 5 depicts for convenience the configuration of the circuit under test before replacement of the FF 502 with the CDC model. As depicted in the timing chart of FIG. 5, when a change in the output signal D from the transmission-side FF 501 is observed and then a reception-side clock event occurs within a given time Tj from the observation, CDC jitter is generated on the output signal Q from the reception-side FF 502. The occurrence of a clock event means a state in which the operation of the reception-side FF 502 has started, triggered by the rising edge of an operation clock for the reception-side FF 502.

As described above, in the conventional CDC model, whether a clock event occurs on the reception-side FF within the given time Tj following a change in a signal output from the transmission-side FF serves as a trigger for the generation of CDC jitter. In other words, setting the given time Tj is important for the generation of CDC jitter at a proper timing. Setting the given time Tj for proper generation of CDC jitter, however, is difficult in some cases depending on the difference in operation clocks between a transmission-side clock domain and a reception-side clock domain.

Figure 6:
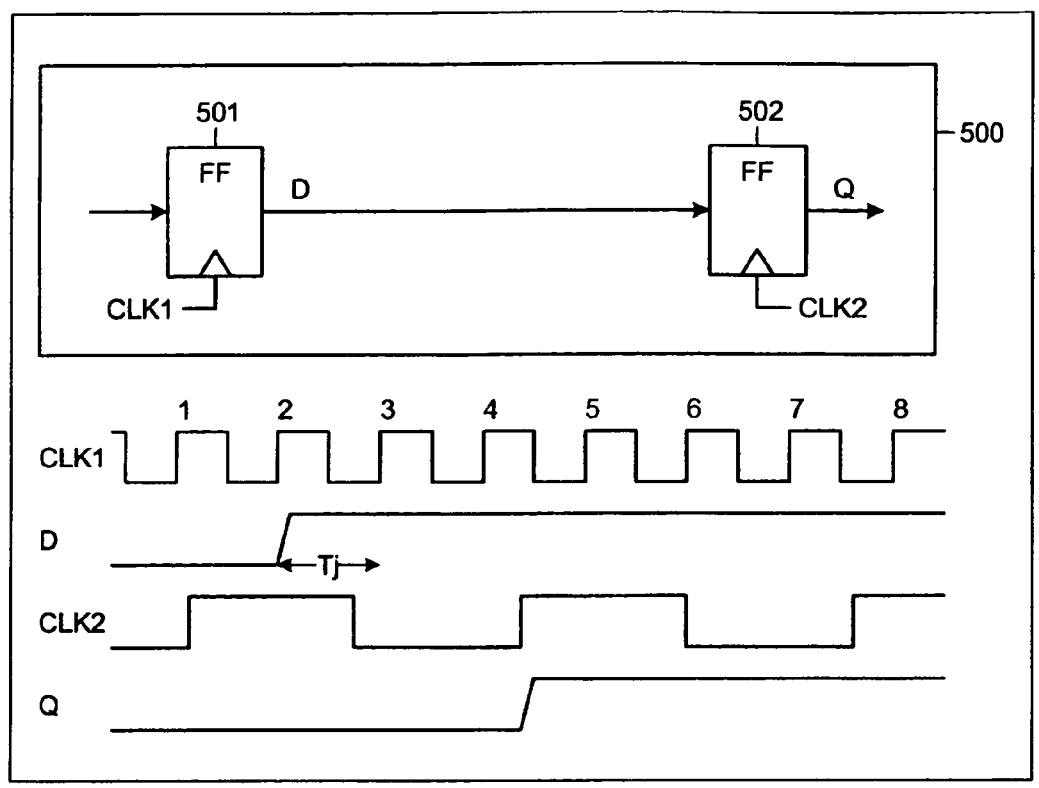
FIG. 6 is a timing chart of an operation example in which a given time Tj is short.

FIG. 6 is a timing chart of an operation example in which the given time Tj is short. If the given time Tj is set short compared to the cycle Tr of a reception-side operation clock, the probability of generation of CDC jitter decreases, as depicted in FIG. 6. The comparatively long cycle Tr of the reception-side operation clock leads to a high possibility that the rising edge of the reception-side operation clock does not occur within the given time Tj.

Hence, the probability of generation of CDC jitter decreases. Actually, the output signal D from the transmission-side FF 501 has changed to increase the possibility that an output signal from the reception-side FF 502 generates a meta-stable state, although such operation contents are unverifiable, resulting in a decline in verification efficiency.

Figure 7:
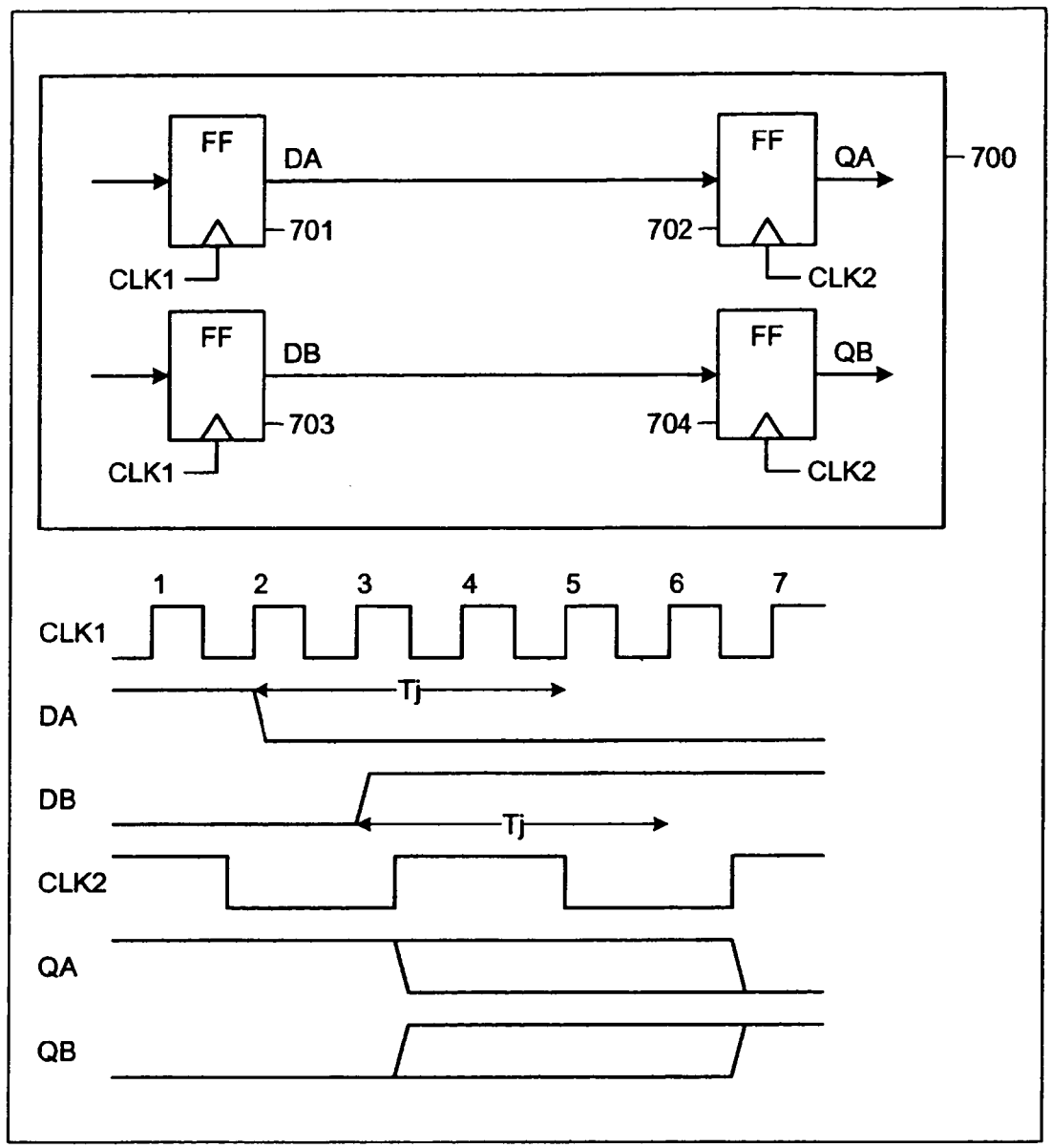
FIG. 7 is a timing chart of an operation example in which the given time Tj is long.

FIG. 7 is a timing chart of an operation example in which the given time Tj is long. In setting the given time Tj, the cycle of a reception-side operation clock as well as the cycle of a transmission-side operation clock must be considered. If the given time Tj is set longer than the cycle Ts of the transmission-side operation clock, a bit pattern not likely to arise in an actual situation results, as depicted in FIG. 7.

As depicted in FIG. 7, if the given time Tj is set longer than the cycle of the transmission-side operation clock, changes in signals output according to the timing of multiple operation clocks may be errantly determined to be a change in a signal output according to the timing of one operation clock.

A simulation model 700 depicted in FIG. 7 includes FFs 701 and 703 serving as transmission-side circuit elements and FFs 702 and 704 serving as reception-side circuit elements. Such a circuit as the simulation model 700 including plural circuit elements usually operates under constraints. In the case of the simulation model 700 depicted in FIG. 7, for example, a constraint is placed to forbid simultaneous output from the reception-side FFs 702 and 704. In actual circuit operation, therefore, a pattern of (QA, QB)=(1, 1) cannot occur.

In the simulation model 700, however, the given time Tj is set long, compared to the transmission-side operation clock (CLK 1). As a result, multiple given times Tj different in start timing from each other overlap to create an overlapping period, during which a reception-side clock event may occur. In the timing chart depicted in FIG. 7, the time Tj is set long and consequently, a change in an output signal DA from the transmission-side FF 701 and a change in an output signal DB from the transmission-side FF 703 cause output of CDC jitter from the reception-side FF 702 and CDC jitter from the reception-side FF 704, respectively. Despite the impossibility of the pattern (QA, QB)=(1, 1), both QA and QB turn out be in a state of output. As a result, the operation of each circuit element cannot be properly verified.

To prevent the pattern (QA, QB)=(1, 1) from occurring, the given time Tj may be set so that CDC jitter is generated for only the signal detected immediately before the rising edge of the reception-side operation clock. This, however, results in verification of only some output signals among multiple output signals. For instance, in the example depicted in FIG. 7, only the meta-stable state generated by the output signal DB from the transmission-side FF 703 is verified. Verification contents thus become biased, causing an omission in verification.

As described above, if a CDC model is introduced, verification efficiency declines if the given time Tj is shorter than the cycle Tr of the reception-side operation clock, while malfunction occurs if the cycle Ts of the transmission-side operation clock is shorter than the given time Tj. Therefore, in a case of a CDC at which the cycle Ts of the transmission-side operation clock is shorter than the cycle Tr of the reception-side operation clock, the setting of the given time Tj that solves the above problems does not exist, posing a problem in that for a CDC with a condition of Ts<Tr, comprehensive verification cannot be carried out even if a CDC model is used.

According to the verification support process of the embodiment, the time of a rising edge of a reception clock is shifted virtually so that a case of a transmission signal change at another timing and affecting a reception value can also be tested efficiently. For example, multiple transmission signals related to each other between a transmission-side circuit element and a reception-side circuit element at a CDC are formed into a group. Changes in output signals output from each transmission-side circuit element are then observed in groups, and one of the observed signal change times is set as a virtually shifted time of a rising edge of the reception clock. Which signal change time is to be selected is determined randomly, so that efficient verification without a bias is possible.

With reference to FIG. 1, an example in which the verification support apparatus 100 carries out the above verification will be described. In FIG. 1, as described above, the propagation of a signal from the circuit block 2 (clock domain A) to the circuit block 3 (clock domain B) is equivalent to a CDC. In conventional CDC simulation, a CDC model is introduced between the circuit block 2 and the circuit block 3 to generate a meta-stable state.

The verification support apparatus 100, on the other hand, is provided with a CDC verification support function of generating a meta-stable state in the circuit block 3 in response to an output signal from the circuit block 2. According to the CDC verification support function, changes in output signals from the circuit block 2 are observed for each clock cycle of the clock domain B. If one or more output signal changes occur, among the times at which the signal changes occurred, one time is selected randomly, and an output signal value at the selected time of signal change is sampled (step S111).

Subsequently, based on the result of the sampling at step S111, the value of a signal (output signal from the circuit block 2) having changed in value at the selected time is replaced with a random logic value, which is then input to the circuit block 3 at the timing of the rising edge of an operation clock for the clock domain B (step S112). In this manner, at step S112, among output signals output from the circuit block 2, an output signal that has changed in value at the sampling time is substituted with a random logic value that is input to the circuit block 3. Through this process, CDC jitter is generated in the circuit block 3.

In conventional CDC simulation, CDC jitter is generated only when an output signal from a transmission-side circuit element changes and then a reception-side clock event occurs within the given time Tj. The verification support apparatus 100 of the embodiment, in contrast, observes output signals from the transmission-side circuit element during one cycle of the reception-side operation clock, and based on a sampling time determined to be one of the output signal change times acquired by the observation, inputs an output signal having changed in value at the sampling time to the reception-side circuit element. Through this process, the verification support apparatus 100 generates CDC jitter responding to a wide range of output signal changes, regardless of the given time Tj.

FIG. 8 is a timing chart of an example of signal propagation in a case of the verification support process according to the embodiment. In the timing chart of FIG. 8, which depicts an example in which, with the simulation model 700, changes in two output signals DA and DB are observed during one cycle of the reception-side operation clock CLK 2. The effect of one of the two output signal changes, therefore, is selected and is propagated to a circuit element downstream.

For example, in the case of a selection example 810, an output signal change in DA at a cycle 2 of the CLK 1 is used and is input to the reception-side circuit element. A random logic value is thus input to reception-side FF output QA corresponding to DA. In a case of a selection example 820, an output signal change in DB at a cycle 3 of the CLK 1 is used and is input to the reception-side circuit element. A random logic value is thus input to reception-side FF output QB corresponding to DB.

In FIG. 8, only one of two signal change times is adopted in both selection examples 810 and 820. This prevents a constraint violation of the occurrence of the pattern (QA, QB)= (1, 1). Because CDC signals are kept under observation during the cycle of the reception-side clock, omissions in detecting changes in the CDC signals are suppressed. As described above, use of the verification support apparatus 100 of the embodiment supports the realization of efficient verification with few verification omissions even in verification of a logic design including CDCs.

A configuration example of the verification support apparatus 100 and the contents of processes by the verification support apparatus 100 will hereinafter be described in detail. The configuration example and process contents realize the verification support process of the embodiment.

FIG. 9 is a block diagram of a hardware configuration of a verification support apparatus 100 according to the embodiment. As depicted in FIG. 9, the verification support apparatus 100 includes a central processing unit (CPU) 901, a read-only memory (ROM) 902, a random access memory (RAM) 903, a magnetic disk drive 904, a magnetic disk 905, an optical disk drive 906, an optical disk 907, a display 908, an interface (I/F) 909, a keyboard 910, a mouse 911, a scanner 912, and a printer 913, respectively connected by a bus 900.

The CPU 901 governs overall control of the verification support apparatus 100. The ROM 902 stores therein programs such as a boot program. The RAM 903 is used as a work area of the CPU 901. The magnetic disk drive 904, under the control of the CPU 901, controls the reading and writing of data with respect to the magnetic disk 905. The magnetic disk 905 stores therein data written under control of the magnetic disk drive 904.

The optical disk drive 906, under the control of the CPU 901, controls the reading and writing of data with respect to the optical disk 907. The optical disk 907 stores therein data written under control of the optical disk drive 906, the data being read by a computer.

The display 908 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 908.

The I/F 909 is connected to a network 914 such as a local area network (LAN), a wide area network (WAN), and the Internet through a communication line and is connected to other apparatuses through the network 914. The I/F 909 administers an internal interface with the network 914 and controls the input/output of data from/to external apparatuses. For example, a modem or a LAN adaptor may be employed as the I/F 909.

The keyboard 910 includes, for example, keys for inputting letters, numerals, and various instructions and performs the input of data. Alternatively, a touch-panel-type input pad or numeric keypad, etc. may be adopted. The mouse 911 is used to move the cursor, select a region, or move and change the size of windows. A track ball or a joy stick may be adopted provided each respectively has a function similar to a pointing device.

The scanner 912 optically reads an image and takes in the image data into the verification support apparatus 100. The scanner 912 may have an optical character recognition (OCR) function as well. The printer 913 prints image data and text data. The printer 913 may be, for example, a laser printer or an ink jet printer.

FIG. 10A is a block diagram of a first functional configuration of the verification support apparatus. The verification support apparatus 100 includes a receiving unit 1001, a detecting unit 1002, an input unit 1003, an output unit 1004, an extracting unit 1005, a specifying unit 1006, and a logic simulator 110 that carries out CDC simulation of an asynchronous location.

The functional units (receiving unit 1001 to specifying unit 1006) serving as a control unit, are implemented, for example, by executing on the CPU 901, programs stored in memory devices such as the ROM 902, RAM 903, magnetic disk 905, and optical disk 907 or through the operation of the I/F 909 depicted in FIG. 9. The logic simulator 110 is capable of realizing a circuit under test by software and simulating the operation of each circuit element, based on a configuration of the circuit described in circuit information 101.

The receiving unit 1001 has a function of receiving specification of an asynchronous location (CDC occurrence location) to be verified. For example, the receiving unit 1001 receives specification of an asynchronous location where asynchronous location data is transferred between clock domains having operation clocks different from each other in the circuit under test. An asynchronous location means a location in the circuit under test, at which location data is transferred between clock domains having operation clocks different from each other. An asynchronous location is specified by receiving specifying information 1000 from a user or a superior program. A received asynchronous location is stored in memory areas of the RAM 903, magnetic disk 905, optical disk 907, etc.

The detecting unit 1002 has a function of observing the operation of the circuit under test executed by the simulator 110 (simulation model) and detecting a change in an output signal from a transmission-side circuit element for each given period. For example, the detecting unit 1002 detects the time of a change in a signal output from each transmission-side circuit element on the logic simulator 110 during one cycle of a reception-side clock at a specified asynchronous location.

The result of the detection is stored in the memory areas of the RAM 903, magnetic disk 905, optical disk 907, etc. The result of detection by the detecting unit 1002 is used by the input unit 1003, which will be described later, for inputting a sampling value to the reception-side circuit element, and then is reset, after which an output signal detecting process on the next one-clock cycle follows.

The input unit 1003 has a function of inputting a sampling value to each reception-side circuit element on the logic simulator 110, based on the result of detection by the detecting unit 1002. For example, the input unit 1003 carries out an input process in an action triggered by the rising edge of the reception-side operation clock that follows the elapse of one clock cycle on which detection by the detecting unit 1002 is carried out.

In carrying out the input process, the input unit 1003 determines one of the times at which changes in an output signal are detected by the detecting unit 1002 during the one-clock cycle to be a sampling time, replaces the value of the output signal with a random logic value at the sampling time, and then inputs the logic value to each reception-side circuit element.

If elements 1 and 2 are transmission-side circuit elements, the detecting unit 1002 detects a change in an output signal from element 1 and a change in an output signal from element 2. The input unit 1003 selects one of the times at which the detecting unit 1002 detects the changes in the output signals, leaves the value of the output signal as it is or turns the output signal into a random logic value depending on the selection, and inputs the output signal value or the logic value to each circuit element (each reception-side circuit element) downstream.

For example, when the input unit 1003 selects time T at which a change in an output signal from the element 1 is detected, it is needless to say that the output signal from the element 1 has changed at the time T. The input unit 1003 thus replaces the output signal from the element 1 with a random logic value and inputs the logic value to each corresponding reception-side circuit element. Meanwhile, the output signal from the element 2 has not changed at the time T. The input unit 1003, therefore, inputs the value of the output signal from the element 2 as it is to each corresponding reception-side circuit element.

Sampling may be carried out after all signal changes detected by the detecting unit 1002 during one clock cycle on the reception-side have been recorded. Further, probability-based re-sampling may be carried out to update the sampling value each time a signal change is observed. In the latter case, re-sampling is carried out at a probability of 1/N over the N-th signal change. In this manner, a sampling result without a bias can be obtained.

The input unit 1003 may continue to output random logic values for a given time equivalent to a time of generation of a meta-stable state. Input details are stored in the memory areas of the RAM 903, magnetic disk 905, optical disk 907, etc.

The output unit 1004 has a function of outputting an operation result 102 of the reception-side circuit element. As a result of input of a random logic value from the input unit 1003, the logic simulator 110 causes behavior for a situation where a meta-stable state is generated at each reception-side circuit element at an asynchronous location.

Thus, the output unit 1004 outputs the operation result 102 of the reception-side circuit element in a case of generation of a meta-stable state. Forms of output include, for example, display on the display 908, printout from the printer 913, and transmission to an external apparatus through the I/F 909. The operation result 102 may be stored in the memory areas of the RAM 903, magnetic disk 905, optical disk 907, etc.

A user of the verification support apparatus 100 determines whether the operation result 102 output from the output unit 1004 conforms to design contents and thereby, is able to verify whether the reception-side circuit element at an asynchronous location operates properly even if a meta-stable state is generated. Upon finding out through the verification that the reception-side circuit element operates properly, the user can proceed to a subsequent manufacturing process.

Upon finding out that the reception-side circuit element does not operate properly, the user reviews the design contents and repeats verification until proper operation of the circuit element is confirmed. As described above, verifying operations of asynchronous locations in the circuit under test without omissions prevents malfunction from occurring in a fabrication process downstream to lead to re-design from the beginning.

The verification support apparatus 100 includes the extracting unit 1005 and the specifying unit 1006, which will be described later. This configuration enables the verification support apparatus 100 to narrow down verification locations and thus, realizes a verification support apparatus 100 that is more usable to the user.

The extracting unit 1005 has a function of extracting an asynchronous location from the circuit under test. For example, the extracting unit 1005 extracts from the circuit under test and based on a circuit design described in the circuit information 101 of the circuit under test, an asynchronous location at which data is transferred between clock domains having operation clocks different from each other. When the extracting unit 1005 extracts the asynchronous location, the detecting unit 1002 detects an output signal from each transmission-side circuit element at the asynchronous location extracted by the extracting unit 1005. The result of the extraction is stored in the memory areas of the RAM 903, magnetic disk 905, optical disk 907, etc.

As described above, the verification support apparatus 100 includes the extracting unit 1005 having the function of automatically extracting an asynchronous location, enabling the user of the verification support apparatus 100 to efficiently verify a location at which a CDC occurs, regardless of the skillfulness of the user in verification.

The specifying unit 1006 has a function of receiving specification of a transmission-side circuit element and a reception-side circuit element, among transmission-side circuit elements and reception-side circuit elements at an asynchronous location. If the specifying unit 1006 receives specification of a circuit element, the detecting unit 1002 detects a change in an output signal output from a specified circuit element among the transmission-side circuit elements, and the input unit 1003 inputs a signal value to the specified circuit element. A circuit element is specified by receiving the specifying information 1000 from the user or a superior system.

As described above, through specification of a circuit element by the specifying unit 1006, the verification support apparatus 100 is able to acquire the operation result 102 of the specified element only. An asynchronous location at which a circuit element is specified may be a specified asynchronous location received by the receiving unit 1001 or may be an asynchronous location extracted by the extracting unit 1005. The result of the specification is stored in the memory areas of the RAM 903, magnetic disk 905, optical disk 907, etc.

In the case of the verification support apparatus 100 depicted in FIG. 10A, one detection result is selected randomly from among the detection results obtained by the detecting unit 1002 concerning changes in an output signal from the transmission-side circuit element at an asynchronous location. The input unit 1003 replaces the value of the selected detection result with a random logic value and inputs the logic value to the corresponding reception-side circuit element. In this manner, whether the reception-side circuit element operates properly in a meta-stable state can be verified.

FIG. 10B is a block diagram of a second functional configuration of the verification support apparatus. The verification support apparatus 100 of FIG. 10B is depicted as a configuration example of another functional unit for realizing the verification support process of the embodiment. The verification support apparatus 100 depicted in FIG. 10B is provided with a simulation model generating unit 1010 that replaces the detecting unit 1002 and the input unit 1003. The simulation model generating unit 1010 has a function of generating a simulation model of a circuit that realizes functions equivalent to the functions of the detecting unit 1002 and input unit 1003.

The simulation model generating unit 1010 generates a simulation model in which elements realizing the functions of the detecting unit 1002 and input unit 1003 described in FIG. 10A are introduced at an asynchronous location in the circuit under test. For example, design information of first to third elements stored in advance in various memory devices is read out, and the first to the third elements are set between each transmission-side circuit element and each reception-side circuit element at the asynchronous location to generate the simulation model.

The first element is the element having a function of detecting a change in a signal output upstream. The second element is the element having a function of holding the value of the signal output from upstream at the time at which the first element detects the signal change. The third element is the element having a function of inputting the value held by the second element to a downstream element at one of the times at which the first element detects signal changes in an action triggered by the rising edge of downstream operation clock. The third element also has a function of replacing, with a random logic value, a signal value for which a change has been detected by the first element and inputting the logic value to a downstream element.

The simulation model generating unit 1010 has a function of identifying each transmission-side circuit element and each reception-side circuit element at an asynchronous location extracted from the circuit under test by the extracting unit 1005. The simulation model generating unit 1010 then sets each transmission-side circuit element upstream to the first element to realize detection of a change in an output signal from each transmission-side circuit element by the first element.

The simulation model generating unit 1010 also sets each reception-side circuit element downstream to the third element to realize signal input from the third element. For example, at one of the times at which the first element detects signal change, the simulation model generating unit 1010 causes the third element to input a value held by the second element and a random value to each reception-side circuit element. As described above, an output signal having changed at the time selected is input as a random logic value, and an output signal not having changed at the time is input as it is.

The first to the third elements may be provided as known circuit elements or as circuit elements newly designed by the user. In first and second examples to be described later, the first element is provided as a jitter sampler, the second element is provided as an FF, and the third element is provided as a selector that inputs a value held by the FF or a random value.

The simulation model generating unit 1010 is capable of generating a simulation model according to the embodiment by adding circuit elements, such as the jitter sampler and the FF (the selector is made by a CDC model generating tool in the first and the second examples to be described later), to a simulation model generated by a conventional CDC model generating tool. The simulation model generating tool is capable of generating a CDC model based on element interconnections and clock domain settings described in the circuit information 101.

The jitter sampler is a circuit element that executes a process equivalent to the process executed by the detecting unit 1002. The FF stores the result of detection of a change in an output signal from the transmission-side circuit element. According to an instruction from the jitter sampler, the selector inputs a detected output signal change as a random logic value at the probability of 1/N, to the reception-side circuit element. Input of the random logic value to the reception-side circuit element enables verification of whether the reception-side circuit element operates properly in a meta-stable state.

Figure 12:
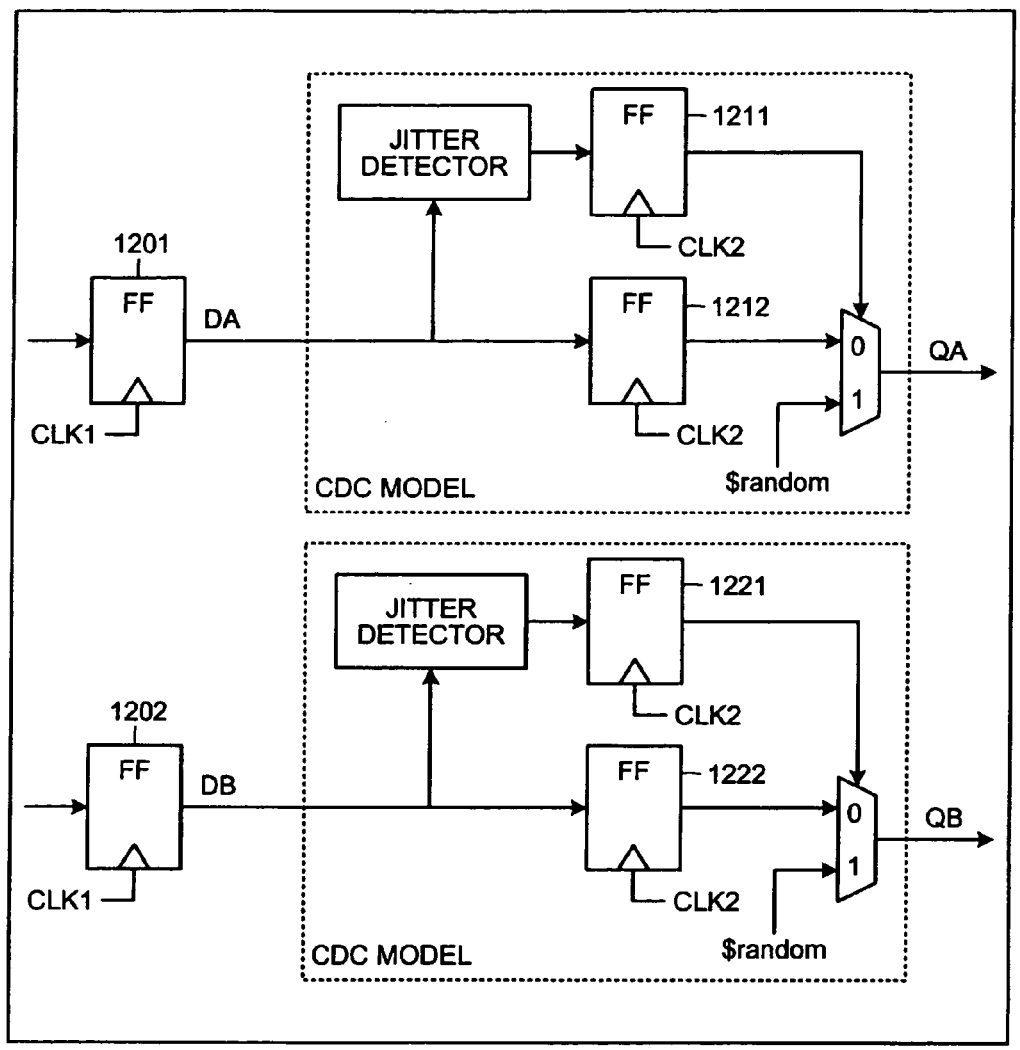
FIGS. 12 and 13 are circuit diagrams of configuration examples of conventional simulation models.
Figure 13:
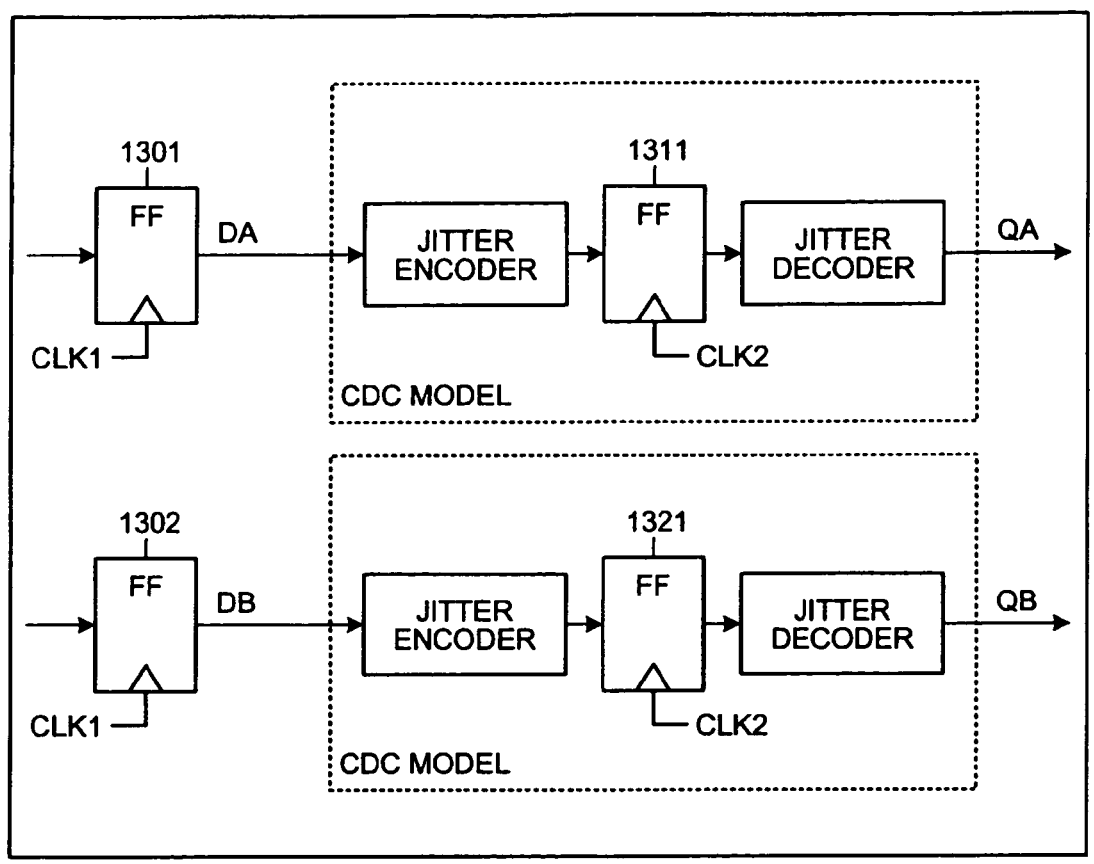

For example, the conventional CDC model generating tool provides a CDC model in which a jitter detector and an input element that generates a random logic value in place of an output signal are added to an asynchronous location (e.g., CDC model depicted in FIG. 12 to be described later) and a CDC model in which a jitter encoder, a jitter decoder, and the input element are added to an asynchronous location (e.g., CDC model depicted in FIG. 13).

Figure 14:
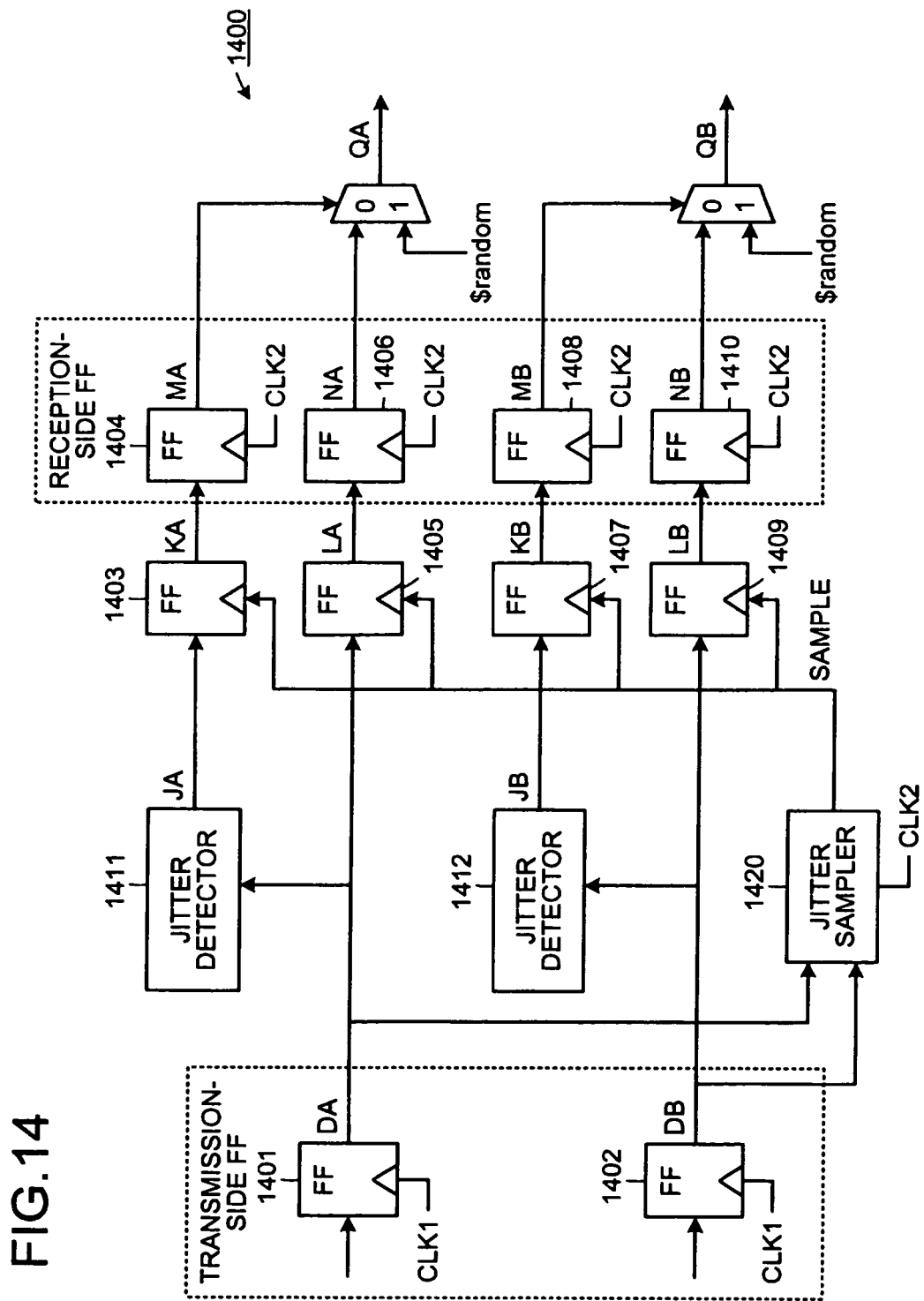
FIG. 14 is a circuit diagram of a configuration of a first simulation model of the embodiment.
Figure 15:
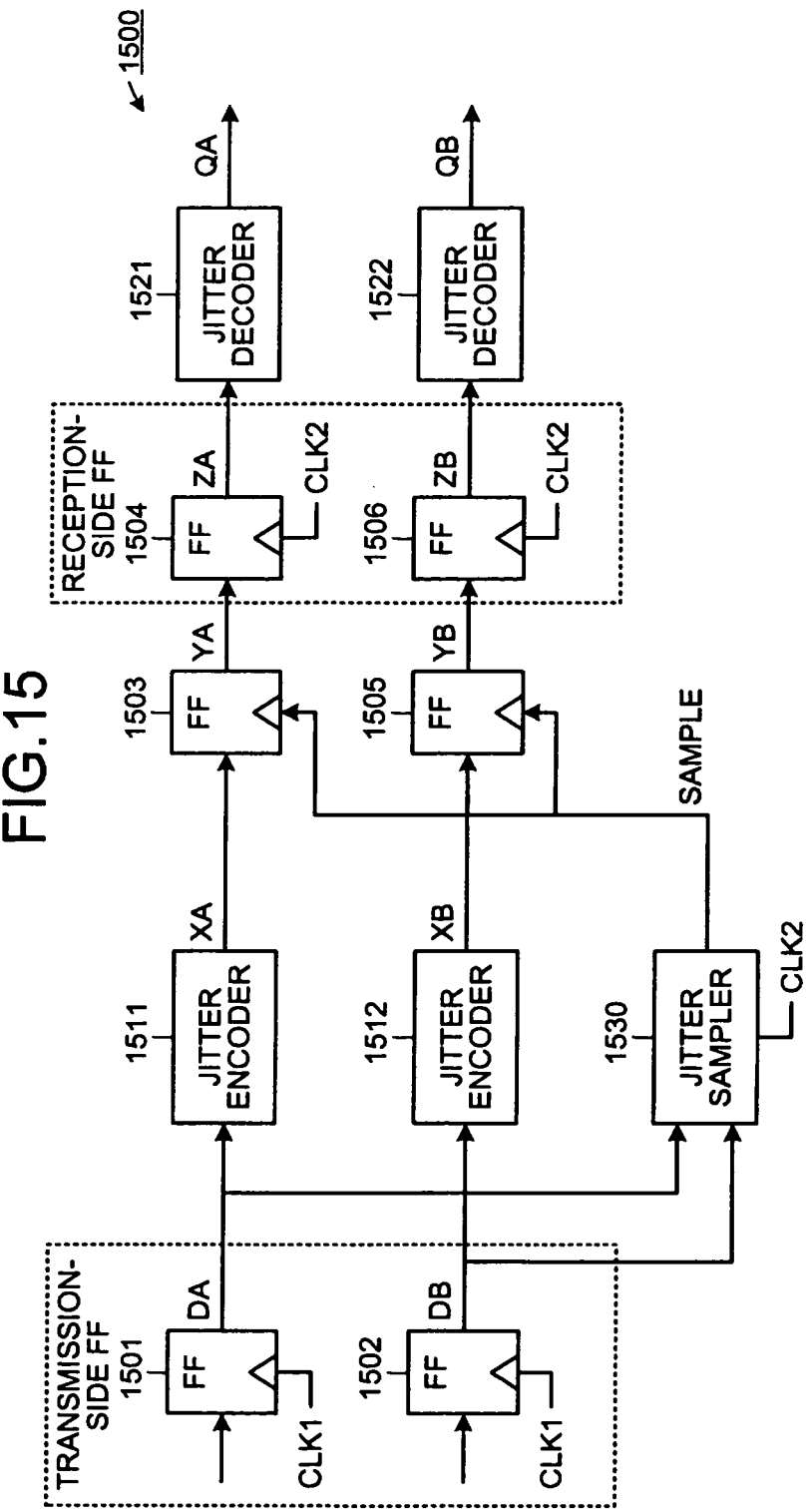
FIG. 15 is a circuit diagram of a configuration of a second simulation model of the embodiment.

The simulation model generating unit 1010 usually generates a CDC model in which the jitter sampler and the FF are added to each transmission-side circuit element and reception-side circuit element. FIG. 14 to be described later depicts an example of generation of a simulation model obtained by adding a jitter sampler and FFs to a CDC model in which jitter detectors and input elements are added to an asynchronous location. FIG. 15 to be described later depicts an example of generation of a simulation model obtained by adding a jitter sampler and FFs to a CDC model in which jitter encoders, jitter decoders, and input elements are added to an asynchronous location.

A simulation model generated by the simulation model generating unit 1010 is executed by the logic simulator 110, which means that the logic simulator 110 functions as a simulation model executing unit. The logic simulator 110 executes a generated simulation model, enabling reproduction of the operation at an asynchronous location. If the output unit 1004 is connected to the simulation model generating unit 1010, the output unit 1004 outputs the result of execution of a simulation model. The logic simulator 110 is thus capable of executing CDC simulation of a specified asynchronous location.

FIG. 11A is a flowchart of a first verification support procedure by the verification support apparatus. By executing each process depicted in FIG. 11A, the operation of each reception-side circuit element in a case of generation of a meta-stable state can be verified randomly.

In FIG. 11A, the verification support apparatus 100 determines whether the receiving unit 1001 has received specification of an asynchronous location (step S1111). If specification of the asynchronous location has been received at step S1111 (step S1111: YES), the verification support apparatus 100 proceeds to a process at step S1113 for verifying the operation at the asynchronous location. Upon determining that specification of the asynchronous location has not been received at step S1111 (step S1111: NO), the verification support apparatus 100 causes the extracting unit 1005 to extract an asynchronous location from a circuit under test (step S1112).

In this manner, if the asynchronous location is specified at step S1111 or step S1112, the verification support apparatus 100 causes the detecting unit 1002 to detect a change in a signal belonging to a transmission signal group (step S1113). A signal belonging to the transmission signal group refers to an output signal from a transmission-side circuit element. The detecting unit 1002, therefore, detects a change in the output signal at step S1113.

Subsequently, the verification support apparatus 100 determines whether a reception-side operation clock is at the rising edge (step S1114). The verification support apparatus 100 returns to the process at step S1113 if the reception-side operation clock is not yet at the rising edge, and remains in a stand-by state until the rising edge of the operation clock (step S1114: NO). Upon determining that the reception-side operation clock is at the rising edge (step S1114: YES), the verification support apparatus 100 determines whether the detecting unit 1002 has detected one or more signal changes (step S1115).

If the detecting unit 1002 has detected one or more signal changes (step S1115: YES), the verification support apparatus 100 selects one of the signal change times (step S1116), and inputs a random value or the value of an output signal to the corresponding reception-side circuit element (step S1117). The random value at step S1117 refers to the random logic value, with which the generation of a meta-stable state is reproduced. Which of the random value and the value of the output signal is to be input to the reception-side circuit element varies depending on the result of detection by the detecting unit 1002.

For example, if a change in the output signal is detected at the time selected at step S1116, the input unit 1003 inputs the random value to the corresponding reception-side circuit element. If a change in the output signal is not detected at the time selected at step S1116, the input unit 1003 inputs the value of the output signal as it is to the reception-side circuit element. For example, in the case of detecting changes in output signals from the elements 1 and 2 serving as transmission-side circuit elements, if a time of detection of a change in the output signal from the element 1 is selected, the output signal from the element 2 has not changed.

If the time of detection of a change in the output signal from the element 1 is selected at step S1116, the output signal from the element 1 is replaced with a random logic value, which is input to the corresponding reception-side circuit element. Meanwhile, the value of the output signal from the element 2 is input as it is to the corresponding reception-side circuit element.

When one or more signal changes are not detected at step S1115 (step S1115: NO), the verification support apparatus 100 has no need of inputting any value to the reception-side circuit element. After the end of the process at step S1115, therefore, the verification support apparatus 100 proceeds to a process at step S1119.

Input of the random logic value at step S1117 causes a state equivalent to a meta-stable state on each reception-side circuit element. The output unit 1004 of the verification support apparatus 100 outputs the operation result 102 of each reception-side circuit element that is the result of the input at step S1117, from the logic simulator 110. Hence, a logic design can be verified using the operation result 102 in a case of generation of a meat-stable state.

Following the process at step S1117, the verification support apparatus 100 resets a detection result given by the detecting unit 1002 (step S1118), and determines whether an end instruction from a superior system or a user has been received (step S1119). Upon determining that the end instruction has not been received at step S1119 (step S1119: NO), the verification support apparatus 100 returns to the process at step S1113, and continues to carry out verification of the reception-side circuit element in the case of generation of a meta-stable state at the asynchronous location.

Upon determining that the end instruction has been received at step S1119 (step S1119: YES), the verification support apparatus 100 ends the series of processes. The user checks the operation result 102 output from the verification support apparatus 100 as a result of the series of processes to be able to verify whether the asynchronous location operates properly.

Figure 11B:
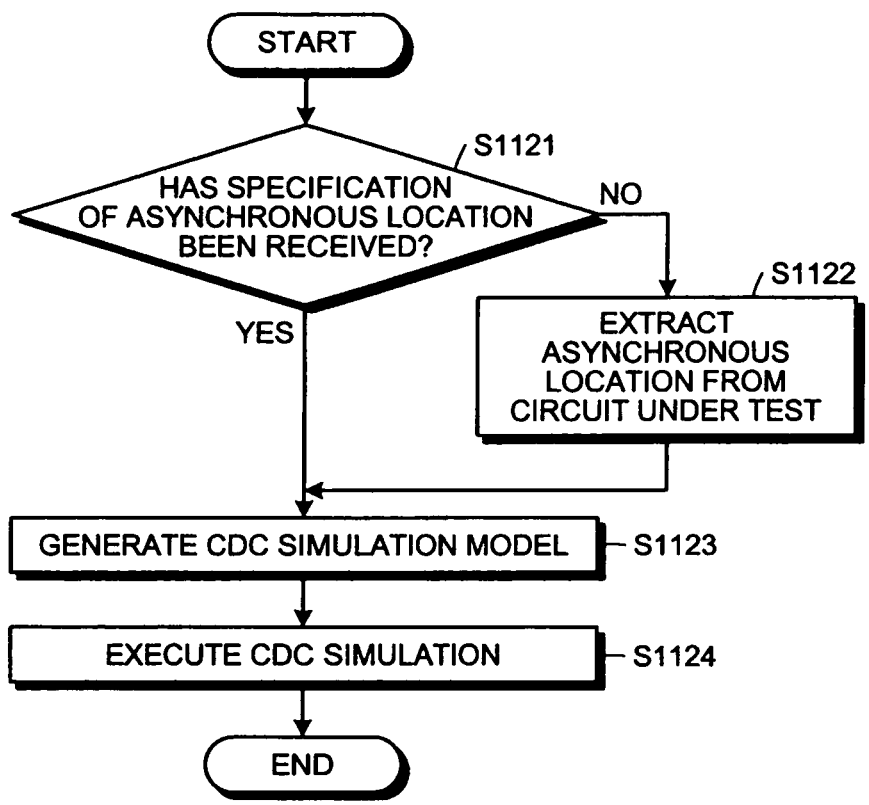
FIG. 11B is a flowchart of a second verification support procedure by the verification support apparatus.

FIG. 11B is a flowchart of a second verification support procedure by the verification support apparatus. Carrying out each of processes of FIG. 11B causes the logic simulator 110 to execute CDC simulation of a specified asynchronous location (asynchronous location that is specified based on the specifying information 1000).

In FIG. 11B, the verification support apparatus 100 determines whether the receiving unit 1001 has received specification of an asynchronous location (step S1121). If specification of the asynchronous location has been received at step S1111 (step S1121: YES), the verification support apparatus 100 proceeds to a process at step S1123 for verifying the operation at the asynchronous location. Upon determining that specification of the asynchronous location has not been received at step S1111 (step S1111: NO), the verification support apparatus 100 causes the extracting unit 1005 to extract an asynchronous location from a circuit under test (step S1112).

Subsequently, the verification support apparatus 100 causes the simulation model generating unit 1010 to generate a CDC simulation model (step S1123). The verification support apparatus 100 then executes CDC simulation of the asynchronous location using the CDC simulation model generated by the simulation model generating unit 1010 (step S1124), and ends the series of processes.

As described above, the verification support apparatus 100 of FIG. 10B generates a CDC simulation model and causes the logic simulator 110 to execute the CDC simulation model, thereby acquiring the operation result 102 from CDC simulation. In the following description, a configuration example of a specific simulation model is explained for a case of the verification support apparatus 100 having the simulation model generating unit 1010.

Configuration examples of simulation models generated by the simulation model generating unit 1010 of FIG. 10B will be described to explain an example of support of verification of a meta-stable state given by the verification support apparatus 100. For comparison, configuration examples of conventional simulation models will be described first. Functions of carrying out the processes described in FIGS. 10B and 11B are added to these simulation models to provide the simulation models of the embodiment, which will then be taken to describe their operation.

FIGS. 12 and 13 are circuit diagrams of configuration examples of conventional simulation models. The simulation model depicted in FIG. 12 includes FFs 1201 and 1202 serving as transmission-side circuit elements that operate under the CLK 1, and FFs 1211 and 1212 and FFs 1221 and 1222 serving as reception-side circuit elements that operate under the CLK 2.

Each pair of the reception-side circuit elements are provided with a jitter detector that detects output signals from the transmission-side circuit element. The reception-side circuit elements of the FFs 1211 and 1212 and the jitter detector make up a CDC model. When the jitter detector detects an output signal from the transmission-side circuit element, the FFs 1211 and 1212 generate a meta-stable state, which is used for CDC verification. A CDC model made up of the FFs 1221 and 1222 and the jitter detector of FIG. 12 operates in the same manner, thus gives support for CDC verification.

The simulation model of FIG. 13 includes FFs 1301 and 1302 serving as transmission-side circuit elements that operate under the CLK 1 and FFs 1311 and 1321 serving as reception-side circuit elements that operate under the CLK 2. Each reception-side circuit element is provided with a jitter encoder and a jitter decoder.

The reception-side circuit elements of the FF 1311, the jitter encoder, and the jitter decoder make up a CDC model. When the jitter encoder observes a change in an output signal from the transmission-side circuit element, the FF 1311 outputs a random logic value equivalent to a meta-stable state through the jitter decoder, and the output logic value is used for CDC verification. A CDC model made up of the jitter encoder, the FF 1321, and the jitter decoder of FIG. 13 operates in the same manner, thus gives support for CDC verification.

Both simulation models depicted in respectively in FIGS. 12 and 13, however, may cause a decline in verification efficiency or malfunction depending on setting of the given time Tj and on the cycles of the CLKs 1 and 2. Configurations for verifying asynchronous locations of FIGS. 12 and 13 by the verification support apparatus 100 will be described.

FIG. 14 is a circuit diagram of a configuration of a first simulation model of the embodiment. In the first simulation model provided as a circuit model 1400, FFs 1401 and 1402 are equivalent to the transmission-side FFs depicted in FIG. 12, and FFs 1404 and 1406 and FFs 1408 and 1410 are equivalent to the reception-side FFs depicted in FIG. 12.

In the first simulation model, to detect changes in output signals from transmission-side circuit elements, jitter detectors 1411 and 1412 are connected downstream to the FFs 1401 and 1402. The first simulation model includes a jitter sampler 1420 that causes a SAMPLE event in an action triggered by a change in an output signal or the rising edge of a reception-side operation clock. The first simulation model also includes FFs 1403, 1405, 1407, and 1409 each of which temporarily holds a signal value on the occurrence of the SAMPLE event. The jitter detectors 1411 and 1412, the jitter sampler 1402, and the FFs 1403, 1405, 1407, and 1409 function as the detecting unit 1002 described in FIG. 10A.

FIG. 15 is a circuit diagram of a configuration of a second simulation model of the embodiment. In the second simulation model provided as a circuit model 1500, FFs 1501 and 1502 are equivalent to the transmission-side FFs depicted in FIG. 13, and FFs 1504 and 1506 are equivalent to the reception-side FFs depicted in FIG. 13.

The second simulation model includes jitter encoders 1511 and 1512 that report to FFs downstream, changes in output signals from the FFs 1501 and 1502 serving as transmission-side circuit elements. The second simulation model also includes a jitter sampler 1530 that causes a SAMPLE event in an action triggered by a change in an output signal or the rising edge of a reception-side operation clock.

The second simulation model further includes FFs 1503 and 1505 each of which temporarily holds a signal value on the occurrence of the SAMPLE event. The jitter encoders 1511 and 1512, the jitter sampler 1530, and the FFs 1503 and 1505 function as the detecting unit 1002 described in FIG. 10A.

In the second simulation model, jitter decoders 1521 and 1522 replace output signals output from the reception-side FFs 1504 and 1506 with random logic values, respectively, and input the random logic values to circuit elements downstream. The jitter decoders 1521 and 1522 function as the input unit 1003 described in FIG. 10A.

Output operations of the jitter detectors, the jitter encoders, the jitter decoders, and the jitter samplers incorporated in the circuit models 1400 and 1500 of FIGS. 14 and 15 will be described in detail.

Figure 16:
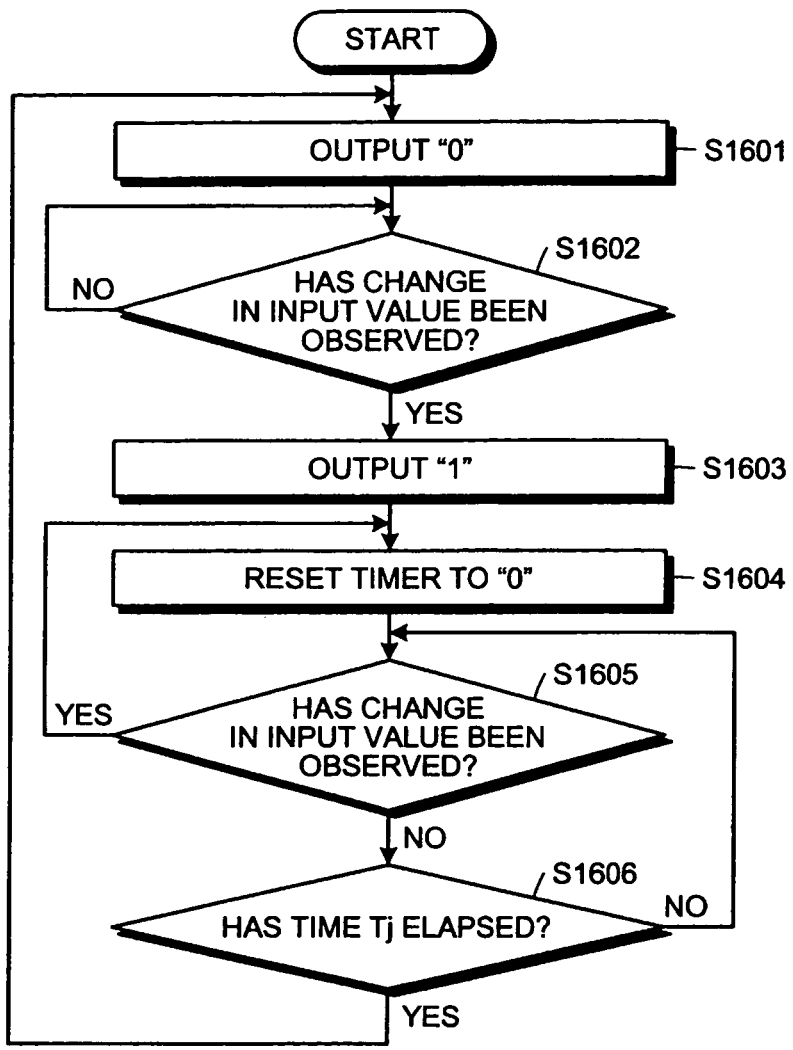
FIG. 16 is a flowchart of an output procedure by a jitter detector.

FIG. 16 is a flowchart of an output procedure by the jitter detector. The jitter detector has a function of outputting a report signal reporting a change in an output signal for a given time (specifically, Tj) upon detection of a change in an output signal from a transmission-side circuit element.

The flowchart of FIG. 16 depicts the procedure of continued output of a report signal responding to a change in an output signal from the transmission-side circuit element after the start of operation of the jitter detector as a result of execution of CDC simulation. Because the jitter detectors 1411 and 1412 depicted in FIG. 14 operate in the same manner, the jitter detectors 1411 and 1412 are referred to commonly as "jitter detector" with no reference numeral attached thereto in the description of FIG. 16.

As depicted in FIG. 16, the jitter detector outputs "0" (step S1601). The jitter detector then determines whether a change in an input value from a transmission-side FF (e.g., FFs 1401 and 1402 of FIG. 14) is observed (step S1602). Until a change in an input value is observed, the jitter detector remains in a stand-by state at step S1601 (step S1602: NO).

Upon observing a change in the input value at step S1602 (step S1602: YES), the jitter detector outputs "1" as a report signal reporting a change in the input value, to an FF connected downstream to the jitter detector (step S1603). Subsequently, the jitter detector resets a timer to "0" (step S1604), and determines whether a change in an input value from the transmission-side FF has been observed (step S1605). The timer continuously counts time. Therefore, when timer resetting is completed through the process at step S1604, the timer immediately starts a new round of time counting from "0".

Upon observing a change in the input value at step S1605 (step S1605: YES), the jitter detector returns to the process at step S1604, resetting the timer to "0". At this time, having observed the input value change, the jitter detector continues to output "1" as a report signal.

If a change in the input value is not observed at step S1605 (step S1605: NO), the jitter detector determines whether the time Tj has elapsed, based on time counting by the timer (step S1606). If the time Tj has not elapsed yet at step S1606 (step S1606: NO), the jitter detector returns to the process at step S1605, and determines again whether a change in an output value is observed.

When the time Tj has elapsed at step S1606 (step S1606: YES), the jitter detector ends reporting the input value change. The jitter detector thus returns to the process at step S1601, and outputs "0" to report a state of no observation of an input value change. The above processes are carried out continuously during a verification process. When the verification process comes to an end or is suspended, an end instruction is issued from the user of the verification support apparatus 100 or a superior program. Following the instruction, the jitter detector ends the series of processes.

Figure 17:
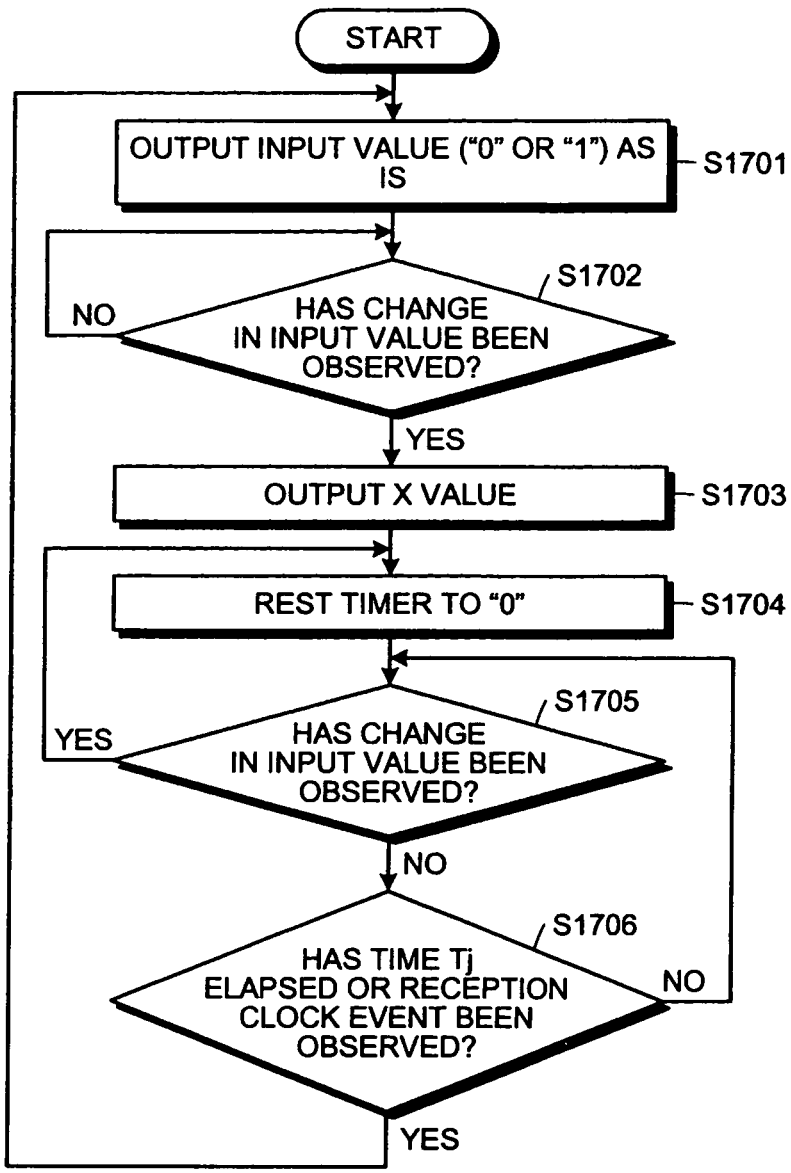
FIG. 17 is a flowchart of an output procedure by a jitter encoder.

FIG. 17 is a flowchart of an output procedure by the jitter encoder. If an input value from a transmission-side FF has changed, the jitter encoder replaces the input value with an X value (random logic value) and outputs the X value to intentionally generate a meta-stable state. The X value is transferred to a reception-side FF to verify whether the reception-side FF operates properly in a meta-stable state. Because the jitter encoders 1511 and 1512 depicted in FIG. 15 each operate in the same manner, the jitter encoders 1511 and 1512 are referred to commonly as "jitter encoder" with no reference numeral attached thereto in the description of FIG. 17.

As depicted in FIG. 17, the jitter encoder outputs an input value from a transmission-side FF (e.g., FFs 1501 and 1502 of FIG. 15) as it is (step S1701). The input value from the transmission-side FF is one of two values of "0" or "1". Subsequently, the jitter encoder determines whether a change in the input value is observed (step S1702).

At step S1702, the jitter encoder remains in a stand-by state until a change in the input value is observed (step S1702: NO). Upon observing a change in the input value at step S1702 (step S1702: YES), the jitter encoder outputs an X value in place of the input value (step S1703).

Subsequently, the jitter encoder resets a timer to "0" (step S1704), and determines whether the encoder has observed a change in an input value from the transmission-side FF (step S1705). The timer continuously counts time. Therefore, when timer resetting is completed through the process at step S1704, the timer immediately starts a new round of time counting from "0".

Upon observing a change in the input value at step S1705 (step S1705: YES), the jitter encoder returns to the process at step S1704, resetting the timer to "0". At this time, having observed the input value change, the jitter encoder continues to output the X value to reproduce a meta-stable state.

If a change in the input value is not observed at step S1705 (step S1705: NO), the jitter encoder determines whether the time Tj has elapsed, based on time counting by the timer or a reception clock event has been observed (step S1706). A reception clock event means that some processing is carried out at one of the reception-side FFs (e.g., FFs 1504 and 1506 of FIG. 15) in response to a rising edge of a clock.

The process at step S1706 is carried out for determining whether output of the X value is to be continued or ended. Therefore, both conditions of "elapse of time Tj" and "observation of reception clock event" at step S1706, are conditions that serve as triggers for ending output of the X value. Thus, if one of the two conditions is satisfied, the jitter encoder is operated to end output of the X value.

If the time Tj has not elapsed and a reception clock event has not been observed at step S1706 (step S1706: NO), the jitter encoder returns to the process at step S1705, again determines whether a change in an input value is observed.

If the time Tj has elapsed or a reception clock event has been observed at step S1706 (step S1706: YES), the jitter encoder ends reporting the input value change. The jitter encoder thus returns to the process at step S1701, and outputs "0" to report a state of no observation of an input value change. The above processes are carried out continuously during a verification process. When the verification process comes to an end or is suspended, an end instruction is issued from the user of the verification support apparatus 100 or a superior program. Following the instruction, the jitter encoder ends the series of processes.

Figure 18:
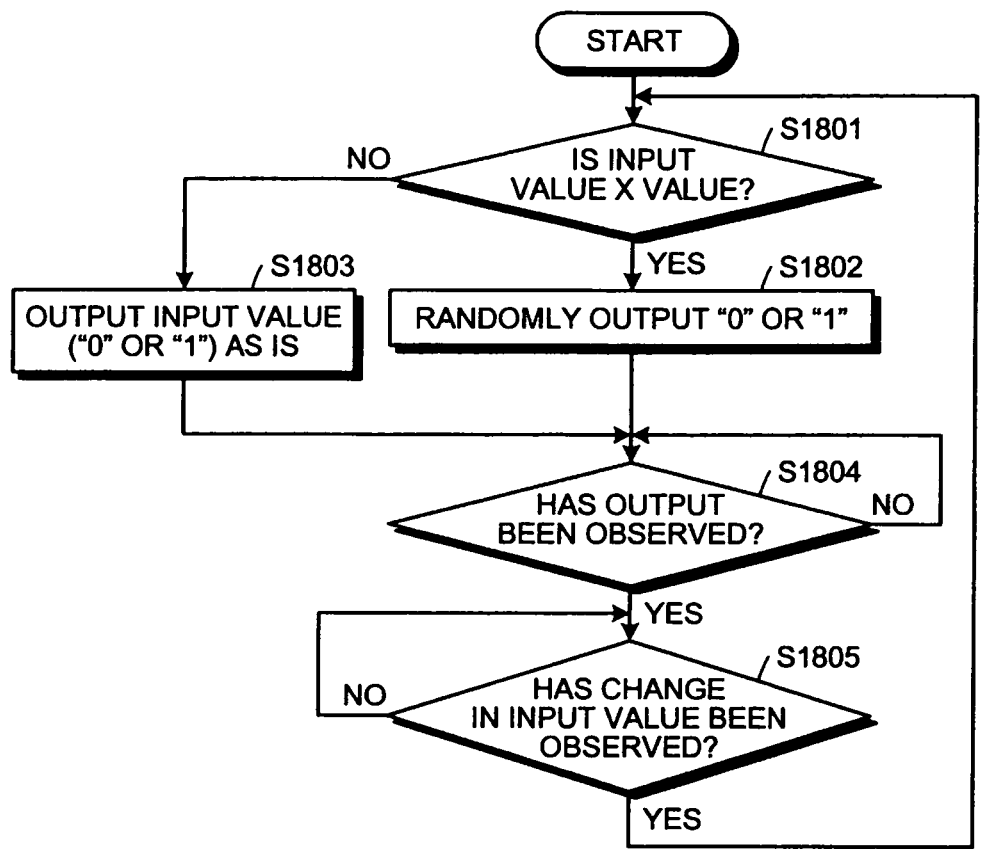
FIG. 18 is a flowchart of an output procedure by a jitter decoder.

FIG. 18 is a flowchart of an output procedure by the jitter decoder. The jitter decoder has a function of outputting an input signal as is or as a random logic value in response to a signal input from an FF upstream.

FIG. 18 depicts the procedure according to which the jitter decoder in the second simulation model of FIG. 15 outputs an input value as is or as a random logic value (X value), to a circuit element downstream realized by CDC simulation in response to the operation of an output-side FF. Because the jitter decoders 1521 and 1522 depicted in FIG. 15 each operate in the same manner, the jitter decoders 1521 and 1522 are referred to as the common "jitter decoder" with no reference numeral attached thereto in the description of FIG. 18.

The jitter decoder starts operating in an action triggered by reception of an input value from an FF at a front stage. The jitter decoder determines whether the input value is an X value (step S1801). If the input value is the X value at step S1801 (step S1801: YES), the jitter decoder randomly outputs "0" or "1" to generate a meta-stable state (step S1802).

If the input value is not the X value at step S1801 (step S1801: NO), the jitter decoder outputs the input value as it is (step S1803). At step S1803, the jitter decoder outputs a signal of "0" or "1" because the input value to the jitter decoder is "0" or "1". The signal output at steps S1802 and S1803 is input to an FF downstream.

Subsequently, the jitter decoder determines whether signal output has been observed at step S1802 or step S1803 (step S1804). At step S1804, the jitter decoder remains in a stand-by state until signal output is observed (step S1804: NO). Upon observing signal output (step S1804: YES), the jitter decoder determines whether a change in an input value from the FF upstream has been observed (step S1805).

At step S1805, the jitter decoder remains in a stand-by state until a change in the input value is observed (step S1805: NO). If a change in the input value is observed (step S1805: YES), the jitter decoder returns to the process at step S1801, and starts processing based on the next clock cycle. The above processes are carried out continuously during a verification process. When the verification process comes to an end or is suspended, an end instruction is issued from the user of the verification support apparatus 100 or a superior program. Following the instruction, the jitter decoder ends the series of processes.

The jitter sampler carries out an event-causing process in response to an input value and an event-causing process in response to a reception clock, as parallel output processing. The jitter sampler causes a SAMPLE event in response to a change in an output signal output from a transmission-side FF and at the same time, causes a SAMPLE event in response to the occurrence of a reception-side clock event. In other words, the jitter sampler causes a SAMPLE event in connection with a transmission-side operation and with a reception-side operation. Because the jitter samplers 1420 and 1530 depicted in FIGS. 14 and 15 each operate in the same manner, the jitter samplers 1420 and 1530 are referred to as the common "jitter sampler" with no reference numeral attached thereto in the description of FIGS. 19 and 20.

Figure 19:
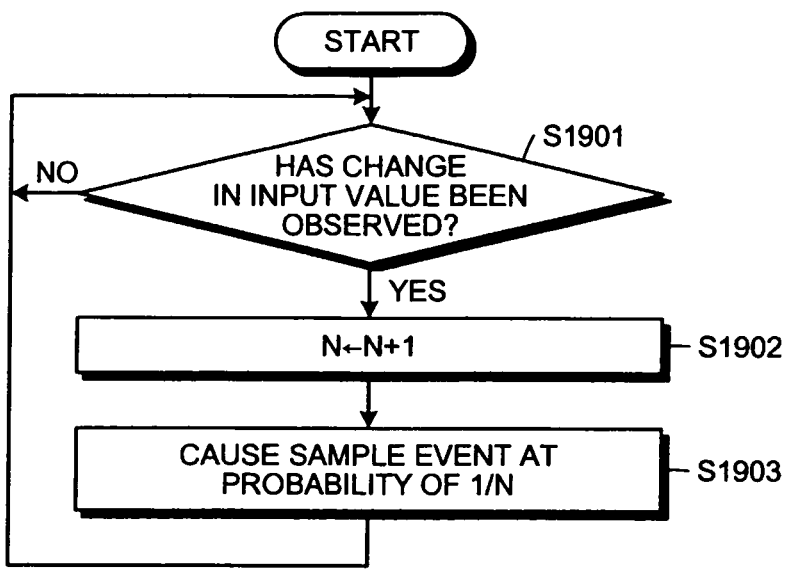
FIG. 19 is a flowchart of an event-causing procedure by a jitter sampler in response to an input value.

FIG. 19 is a flowchart of an event-causing procedure by the jitter sampler in response to an input value. Carrying out each of the processes depicted in FIG. 19 enables the jitter sampler to cause a SAMPLE event in an action triggered by a change in an input value.

In FIG. 19, the jitter sampler determines whether a change in an input value from an FF upstream has been observed, i.e., transmission-side FF (step S1901). At step S1901, the jitter sampler remains in a stand-by state until a change in the input value is observed (step S1901: NO).

Upon observing a change in the input value (step S1901: YES), the jitter sampler increases a variable N to N+1 (step S1902). The variable N represents the total number of input values from the transmission-side FF. The variable N is reset each time a reception-side clock event occurs, so that the variable N represents the total number of input values during one cycle of a reception-side operation clock.

Subsequently, the jitter sampler causes a SAMPLE event at the probability of 1/N (step S1903). A SAMPLE event is an event for instructing to save the current CDC signal value and a change status of the CDC signal value. The jitter sampler then returns to the process at step S1901, after which the jitter sampler causes a SAMPLE event again. Because a SAMPLE event is caused at the probability of 1/N at step S1903, the jitter sampler proceeds to a process of causing a SAMPLE event in an action triggered by one of the input values input from the transmission-side FF during one clock cycle. Ultimately, the last SAMPLE event in one clock cycle (SAMPLE event occurring immediately before the next reception clock event) is significant. Since a SAMPLE event is caused at the probability of 1/N at step S1903, the probability of occurrence of the last SAMPLE event in one clock cycle is the same for any input value change in one clock cycle regardless of how many input value changes have occurred before that input value change.

Figure 20:
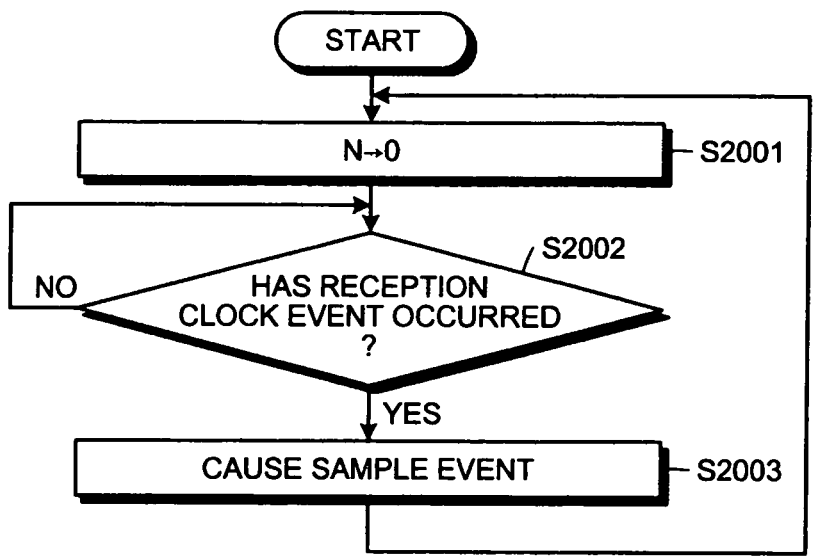
FIG. 20 is a flowchart of an event-causing procedure by the jitter sampler in response to a reception clock.

FIG. 20 is a flowchart of an event-causing procedure by the jitter sampler in response to a reception clock. Carrying out each of processes depicted in FIG. 20 enables the jitter sampler to cause a SAMPLE event in an action triggered by the occurrence of a reception clock event at a reception-side FF. This procedure is intended for initialization at each reception clock cycle.

In FIG. 20, the jitter sampler resets the variable N to "0" (step S2001). The jitter sampler then determines whether a reception clock event has occurred at the reception-side FF (step S2002). At step S2002, the jitter sampler remains in a stand-by state until the reception clock event occurs (step S2002: No).

Upon observing the occurrence of the reception clock event (step S2002: YES), the jitter sampler causes a SAMPLE event (step S2003). This SAMPLE event, as described above, is an event for inputting a random logic value to an FF downstream to generate a meta-stable state. The jitter sampler then returns to the process at step S2001 to restart the process of generating a SAMPLE event.

As described above, the jitter sampler causes a SAMPLE event at the timing of observation of a new input value input from the transmission-side FF or in an action triggered by the occurrence of a reception clock event at the reception-side FF. When multiple input value changes are observed during one clock cycle on the reception-side, the last SAMPLE event occurs at the same probability for each time of input value change. This prevents the bias of verification contents.

The above processes are carried out continuously during a verification process. When the verification process comes to an end or is suspended, an end instruction is issued from the user of the verification support apparatus 100 or a superior program. Following the instruction, the jitter sampler ends the series of processes.

Figure 21:
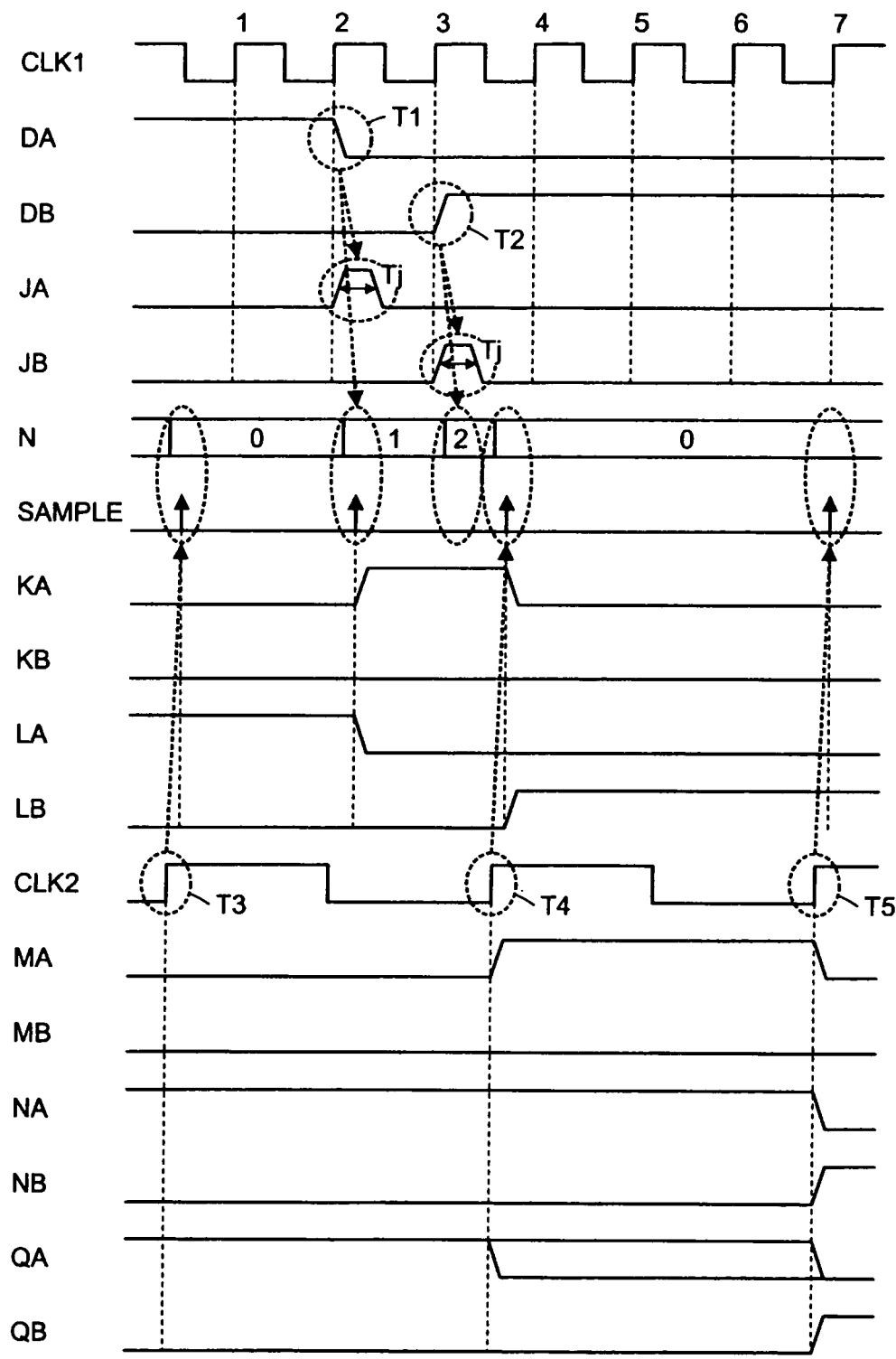
FIG. 21 is a timing chart of an example of the operation of the first simulation model.
Figure 22:
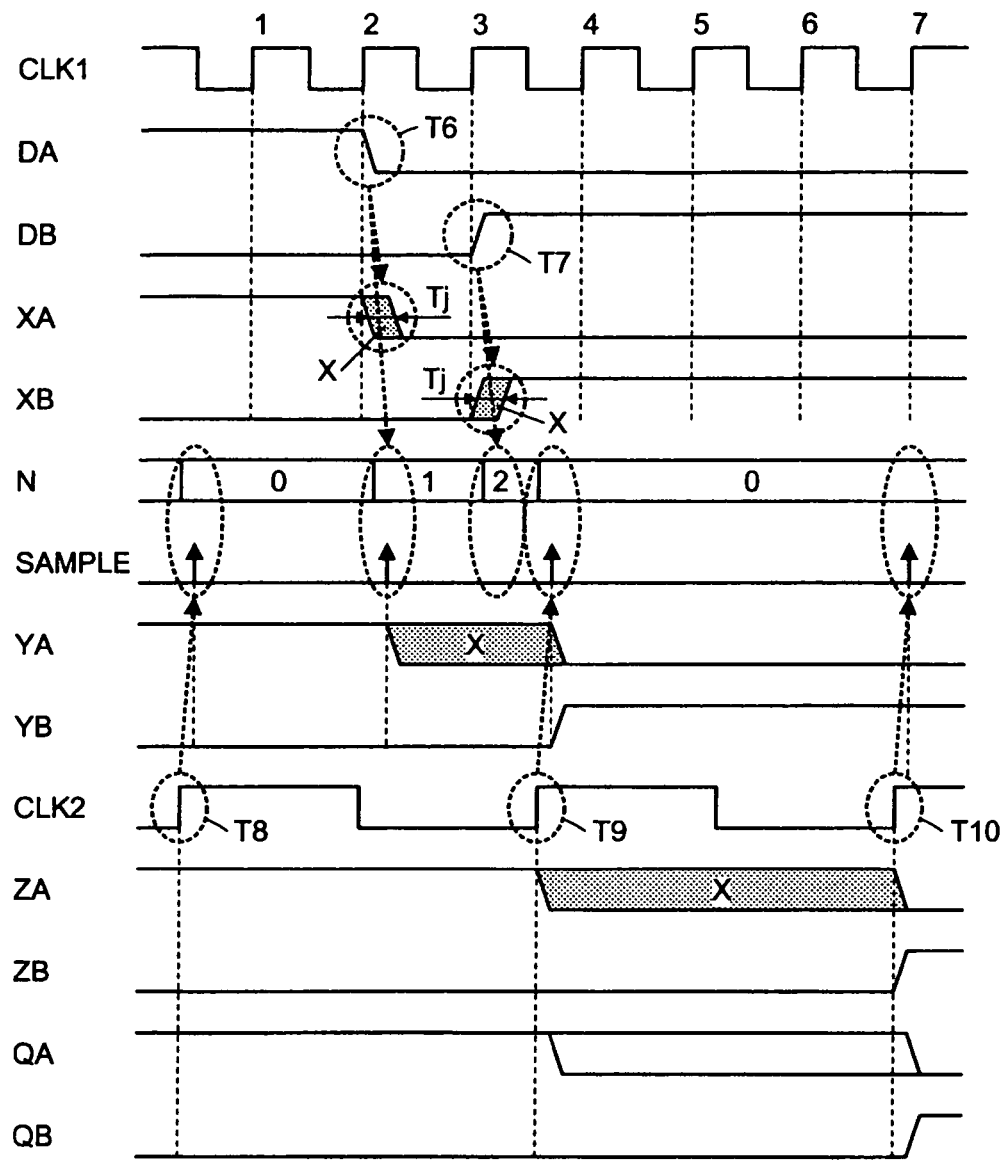
FIG. 22 is a timing chart of an example of the operation of the second simulation model.

FIG. 21 is a timing chart of an example of the operation of the first simulation model, and FIG. 22 is a timing chart of an example of the operation of the second simulation model. Examples of the operation of each circuit element in a case of executing the first and the second simulation models will be described with reference to FIGS. 21 and 22.

In the first simulation model depicted in FIG. 21, when a change in an output signal DA from the transmission-side FF 1401 has occurred (T1), the jitter detector 1411 detects the change in the output signal DA. Upon detecting the change in the output signal DA, the jitter detector 1411 outputs a report signal JA for reporting the signal change to an FF downstream for the given time Tj. The jitter sampler 1420 having observed the change in the output signal DA causes a SAMPLE event (at a probability of 1/1).

When a change in an output signal DB from the transmission-side FF 1401 has occurred (T2), the jitter detector 1412 detects the change in the output signal DB. Upon detecting the change in the output signal DB, the jitter detector 1412 outputs a report signal JB for reporting the signal change to an FF downstream for the given time Tj. The jitter sampler 1420 has observed the change in the output signal DB but, as a result of selection at a probability of 1/2, does not cause a SAMPLE event.

The jitter sampler 1420 causes a SAMPLE event based on the occurrence of a reception clock event at a reception-side FF. For example, the jitter sampler 1420 causes a SAMPLE event at the time of a rising edge of a cycle 1 of the CLK 2 (T3), at the same of a cycle 2 of the CLK 2 (T4), and at the same of a cycle 3 of the CLK 2 (T5).

FIG. 22 depicts the operation of each circuit element in the second simulation model. When a change in the output signal DA from the transmission-side FF 1501 has occurred (T6), the jitter encoder 1511 observes a change in an input value and outputs a random logic value (X value) for the given time Tj. Upon observing the change in the output signal DA, the jitter sampler 1530 causes a SAMPLE event (at the probability of 1/1).

As a result of the occurrence of the SAMPLE event triggered by the change in the output signal DA, the FF 1503 outputs a random logic value (X value).

When a change in an output signal DB from the transmission-side FF 1502 has occurred (T7), the jitter encoder 1512 observes a change in an input value and outputs a random logic value (X value) for the given time Tj. The jitter sampler 1530 has observed the change in the output signal DB but, as a result of selection at the probability of 1/2, does not cause a SAMPLE event.

The jitter sampler 1530 causes a SAMPLE event based on the occurrence of a reception clock event at a reception-side FF. For example, the jitter sampler 1530 causes a SAMPLE event at the time of a rising edge of the cycle 1 of the CLK 2 (T8), at the same of the cycle 2 of the CLK 2 (T9), and at the same of the cycle 3 of the CLK 2 (T10).

In this manner, in a circuit under test including CDCs, the behavior of a circuit element in a meta-stable state can be verified based on an output signal from a transmission-side circuit element and on a reception clock event at a reception-side circuit element, regardless of how the frequency of each circuit block is set.

As described above, according to the embodiment, among changes in an output signal from a transmission-side element at a CDC, the effect of a signal change occurring at one of the times of signal changes detected during one cycle of a reception-side clock is selected, and is output at a timing adjusted to the reception-side clock. As a result, meta-stable states are reproduced without an omission, which enables efficiently verifying whether a circuit operates properly in a meta-stable state.

The above technique may have a function of accepting specification of an asynchronous location where an CDC occurs in the circuit under test. The technique may also have a function of automatically extracting an asynchronous location based on the description of a circuit design. The functions facilitate narrowing down asynchronous locations, thus enabling a user who is less skillful in verification to carry out efficient verification.

The technique may further have a function of separately specifying a transmission-side circuit element to be verified and a reception-side circuit element to be verified at an asynchronous location. By this function, a meta-stable state is generated only on a specified circuit element, realizing highly precise verification that is aimed at a specified location.

The verification support method described in the present embodiment may be implemented by executing a prepared program on a computer such as a personal computer and a workstation. The program is stored on a computer-readable, non-transitory medium such as a hard disk, a flexible disk, a CD-ROM, an MO, and a DVD, read out from the recording medium, and executed by the computer. The program may be a transmission medium that can be distributed through a network such as the Internet.

The verification support apparatus 100 described in the present embodiment can be realized by an application specific integrated circuit (ASIC) such as a standard cell or a structured ASIC, or a programmable logic device (PLD) such as a field-programmable gate array (FPGA). Specifically, for example, functional units (receiving unit 1001 to specifying unit 1006 of the verification support apparatus 100 are defined in hardware description language (HDL), which is logically synthesized and applied to the ASIC, the PLD, etc., thereby enabling manufacture of the verification support apparatus 100.

The embodiment offers an effect of giving support for realizing efficient verification with few verification omissions.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A computer-readable, non-transitory medium storing therein a verification support program that causes a computer to execute a procedure, the procedure comprising:

detecting in a circuit under test, whether a change occurs in a signal output from each circuit element on a transmission-side, during one clock cycle on a reception-side at an asynchronous location where data is transferred between clock domains having differing operation clocks;

selecting a cycle from among a plurality of cycles in which a change occurs in a signal output of one or more circuit elements on the transmission-side during a determined period of time;

selectively inputting during the selected cycle, a signal to each circuit element on the reception-side, where a signal of a circuit element on the transmission side in which no change is detected during the selected cycle is transmitted to a corresponding circuit element on the reception side and a signal of a circuit element on the transmission side in which a change is detected during the selected cycle is replaced with a random logic value and the random logic value being input to each corresponding circuit element on the reception-side, and an action associated with the inputting is triggered by a rising edge of an operation clock on the reception-side after the one clock cycle; and outputting for each circuit element on the reception-side, an operation result obtained based on an input at the inputting.

2. The computer-readable, non-transitory medium according to claim 1, the procedure further comprising specifying an asynchronous location, in the circuit under test, where data is transferred between clock domains having differing operation clocks, wherein the detecting includes detecting during the one clock cycle on the reception-side at the asynchronous location, a change in a signal output from each circuit element on the transmission-side at the asynchronous location, and the inputting includes inputting to each circuit element on the reception-side, the signal for which a change is not detected at the detecting and replacing with the random logic value, the signal for which a change is detected at the detecting and inputting the random logic value to each circuit element on the reception-side, in an action triggered by a rising edge of an operation clock on the reception-side after the one clock cycle.

3. The computer-readable, non-transitory medium according to claim 1, the procedure further comprising extracting, based on design information of the circuit under test, an asynchronous location where data is transferred between clock domains having differing operation clocks, wherein the detecting includes detecting during the one clock cycle on the reception-side at the extracted asynchronous location, a change in a signal output from each circuit element on the transmission-side at the extracted asynchronous location, and the inputting includes inputting to each circuit element on the reception-side, the signal for which a change is not detected at the detecting and replacing with the random logic value, the signal for which a change is detected at the detecting and inputting the random logic value to each circuit element on the reception-side, in an action triggered by a rising edge of an operation clock on the reception-side after the one clock cycle.

4. The computer-readable, non-transitory medium according to claim 1, the procedure further comprising specifying each circuit element on the transmission-side and each circuit element on the reception-side, at the asynchronous location, wherein the detecting includes detecting during the one clock cycle on the reception-side at the asynchronous location, a change in a signal output from each specified circuit element on the transmission-side, the inputting includes inputting to each specified circuit element on the reception-side, the signal for which a change is not detected at the detecting and replacing with the random logic value, the signal for which a change is detected at the detecting and inputting the random logic value to each specified circuit element on the reception-side, in an action triggered by a rising edge of an operation clock on the reception-side after the one clock cycle, and the outputting includes outputting an operation of each specified circuit element on the reception-side.

5. The computer-readable, non-transitory medium according to claim 1, wherein the determined period of time is a cycle of the reception-side operation clock.

6. The computer-readable, non-transitory medium according to claim 1, wherein the inputting is selectively performed based on results of the detecting.

7. A verification support apparatus comprising:
a detecting unit that detects in a circuit under test, whether a change occurs in a signal output from each circuit element on a transmission-side, during one clock cycle on a reception-side at an asynchronous location where data is transferred between clock domains having differing operation clocks;
a selecting unit that selects a cycle from among a plurality of cycles in which a change occurs in a signal output of one or more circuit elements on the transmission-side during a determined period of time;
an input unit that selectively inputs during the selected cycle, a signal to each circuit element on the reception-side, where a signal of a circuit element on the transmission-side in which no change is detected during the selected cycle is transmitted to a corresponding circuit element on the reception side and a signal of a circuit element on the transmission side in which a change is detected during the selected cycle is replaced with a random logic value, the random logic value being input to each corresponding circuit element on the reception-side, and an action associated with the input unit is triggered by a rising edge of an operation clock on the reception-side after the one clock cycle; and
an output unit that outputs for each circuit element on the reception-side, an operation result obtained based on an input by the input unit.

8. The verification support apparatus according to claim 7, wherein the determined period of time is a cycle of the reception-side operation clock.

9. The verification support apparatus according to claim 7, wherein the input unit selectively inputs the signal to each circuit element on the reception side based on results of the circuit under test.

10. A verification support apparatus comprising:
a processor configured to execute a procedure, the procedure comprising:
detecting in a circuit under test, whether a change occurs in a signal output from each circuit element on a transmission-side, during one clock cycle on a reception-side at an asynchronous location where data is transferred between clock domains having differing operation clocks;
selecting a cycle from among a plurality of cycles in which a change occurs in a signal output of one or more circuit elements on the transmission-side during a certain period of time;
selectively inputting during the selected cycle, a signal to each circuit element on the reception-side, where a signal of a circuit element on the transmission side in which no change is detected during the selected cycle is transmitted to a corresponding circuit element on the reception side and a signal of a circuit element on the transmission side in which a change is detected during the selected cycle is replaced with a random logic value, the random logic value being input to each corresponding circuit element on the reception-side, and an action associated with the inputting is triggered by a rising edge of an operation clock on the reception-side after the one clock cycle; and
outputting for each circuit element on the reception-side, an operation result obtained based on an input at the inputting.

11. The verification support apparatus according to claim 10, wherein the certain period of time is a cycle of the reception-side operation clock.

12. A verification support method comprising:
detecting in a circuit under test, whether a change occurs in a signal output from each circuit element on a transmission-side, during one clock cycle on a reception-side at an asynchronous location where data is transferred between clock domains having differing operation clocks;
selecting a cycle from among a plurality of cycles in which a change occurs in a signal output of one or more circuit elements on the transmission-side during a period of time;
selectively inputting during the selected cycle, a signal to each circuit element on the reception-side, where a signal of a circuit element on the transmission side in which no change is detected during the selected cycle is transmitted to a corresponding circuit element on the reception side and a signal of a circuit element on the transmission side in which a change is detected during the selected cycle is replaced with a random logic value, the random logic value being input to each corresponding circuit element on the reception-side, and an action associated with the inputting is triggered by a rising edge of an operation clock on the reception-side after the one clock cycle; and
outputting for each circuit element on the reception-side, an operation result obtained based on an input at the inputting.

13. The verification support method according to claim 12, wherein the period of time is a cycle of the reception-side operation clock.

* * * * *